US009810356B2

United States Patent
Maeda et al.

(10) Patent No.: US 9,810,356 B2
(45) Date of Patent: Nov. 7, 2017

(54) SEPARATION PREVENTING DEVICE OF FLUID PIPE, AND PIPE JOINT

(71) Applicants: COSMO KOKI CO., LTD., Tokyo (JP); KUBOTA Corporation, Osaka (JP)

(72) Inventors: Yoshinori Maeda, Tokyo (JP); Atsushi Sato, Tokyo (JP); Toshihiko Ogata, Tokyo (JP)

(73) Assignees: COSMO KOKI CO., LTD. (JP); KUBOTA CORPORATION (JP)

( * ) Notice: Subject to any disclaimer, the term of this patent is extended or adjusted under 35 U.S.C. 154(b) by 309 days.

(21) Appl. No.: 14/642,276

(22) Filed: Mar. 9, 2015

(65) Prior Publication Data

US 2015/0252926 A1    Sep. 10, 2015

(30) Foreign Application Priority Data

Mar. 10, 2014  (JP) ................................. 2014-046989
Mar. 10, 2014  (JP) ................................. 2014-046990
Mar. 10, 2014  (JP) ................................. 2014-046991
Mar. 11, 2014  (JP) ................................. 2014-047496

(51) Int. Cl.
*F16L 19/00* (2006.01)
*F16L 23/02* (2006.01)
*F16L 23/00* (2006.01)
*F16L 23/024* (2006.01)

(52) U.S. Cl.
CPC ............ *F16L 23/02* (2013.01); *F16L 23/003* (2013.01); *F16L 23/024* (2013.01)

(58) Field of Classification Search
USPC .......... 285/90, 403, 404, 374, 342, 343, 113
See application file for complete search history.

(56) References Cited

U.S. PATENT DOCUMENTS

| 4,848,808 A | * | 7/1989 | Pannell | F16L 21/08 285/337 |
| 5,544,922 A | * | 8/1996 | Shumard | F16L 25/065 285/23 |
| 6,328,343 B1 | * | 12/2001 | Hosie | E21B 17/046 285/123.13 |

FOREIGN PATENT DOCUMENTS

| JP | 52-166815 | 12/1977 | ............. F16L 21/08 |
| JP | 58-31027 | 7/1983 | ............. F16L 21/08 |
| JP | 4-1434 | 1/1992 | ............. F16L 21/08 |

(Continued)

*Primary Examiner* — Aaron Dunwoody
(74) *Attorney, Agent, or Firm* — Hayes Soloway P.C.

(57) ABSTRACT

A separation preventing device that prevents separation of a fluid pipe in a pipe axis direction, includes a main body externally fitted to an outer peripheral surface of the fluid pipe and has a recess portion facing the outer peripheral surface; a locking member housed in the recess portion in a tiltable manner and is able to bite into the outer peripheral surface of the fluid pipe; a pressing member provided in the main body member and presses the locking member so as to bite into the outer peripheral surface of the fluid pipe; and an interposition member interposed between the locking member and the pressing member, wherein the interposition member is equipped with a tapered surface coming into contact with an outer surface of the locking member, and is housed in the recess portion in a state of having an acceptable movement value of a predetermined width in the pipe axis direction of the fluid pipe.

27 Claims, 19 Drawing Sheets

(56) References Cited

FOREIGN PATENT DOCUMENTS

JP 2005-3207 1/2005

* cited by examiner (a)

(b)

(a)

(b)

(a)

(b)

(a)

(b)

(a)

(b)

(a)

(b)

(a)

(b)

(a)

(b)

(a)

(b)

(a)

(b)

SEPARATION PREVENTING DEVICE OF FLUID PIPE, AND PIPE JOINT

BACKGROUND OF THE INVENTION

Field of the Invention

The present invention relates to a separation preventing device that prevents separation of a fluid pipe in a pipe axis direction. More particularly, the present invention relates to a separation preventing device that has elasticity by which even when unexpected external force such as earthquake occurs in a fluid pipe network formed by connecting a plurality of fluid pipes, a connection portion of the fluid pipe expands and contracts in the pipe axis direction in response to the external force by a predetermined acceptable length, and has earthquake resistance by which the fluid pipe is prevented from being separated beyond the acceptable length.

Description of the Related Art

In a separation preventing device and a pipe joint of the related art, a wedge member (a locking member) having a plurality of wedge portions is housed in a recess portion of a pressing ring (a main body member) externally fitted to an outer peripheral surface of a pipe spigot (a fluid pipe), the main body member is provided with a clamping tool (a pressing member), and when external force due to earthquake or the like is generated in a direction of separating the fluid pipe in a pipe axis direction, by pressing the locking member against the outer peripheral surface of the fluid pipe via an intermediary member (an interposition member) having a tapered surface, the wedge portion is caused to bite into the fluid pipe, thereby preventing the separation of the fluid pipe in the pipe axis direction (for example, see Utility Model Publication No. 58-31027 (page 3, FIG. 3)).

Moreover, in the separation preventing device and the pipe joint of the related art, an engaging piece (a locking member) having a plurality of locking claws (wedge portions) is housed in a recess portion of a clamping plate (a main body member) externally fitted onto an outer peripheral surface of an original pipe (a pipe spigot), the clamping plate (the main body member) is provided with a pressing screw (a pressing member), and when the external force due to earthquake or the like is generated in a direction of separating the fluid pipe in the pipe axis direction, by pressing the locking claws (the wedge portions) against the outer peripheral surface of the fluid pipe, the locking claws (the wedge portions) are caused to bite into the fluid pipe to prevent the separation of the fluid pipe in the pipe axis direction (for example, see Utility Model Publication No. 52-166815 (page 3, FIG. 3)).

Moreover, in the separation preventing device and the pipe joint of the related art, in a recess portion of a pressing ring (a main body member) externally fitted to an outer peripheral surface of a pipe spigot, a pressing bolt (a pressing member) is provided in the pressing ring (the main body member) in which a retaining member (a locking member) having a plurality of projections (wedge portions) is housed, and when external force due to an earthquake or the like is generated in a direction of separating the pipe spigot in a pipe axis direction, by pressing the plurality of projections (the wedge portions) against the outer circumferential surface of the pipe spigot, the plurality of projections (the wedge portions) is caused to bite into the pipe spigot, thereby preventing the separation of the pipe spigot in the pipe axis direction (for example, see Japanese Patent Laid-Open No. 2005-3207 (pages 5 to 7, FIGS. 1 to 4)).

Furthermore, in the separation preventing device and the pipe joint of the related art, a retainer (a locking member) having a plurality of wedge portions is housed in a recess portion of a gland (a main body member) externally fitted onto an outer peripheral surface of a pipe spigot (a fluid pipe) via a holder (an elastic body), and a pressing bolt (a pressing member) is provided in the main body member. Thus, when the external force due to an earthquake or the like is generated in a direction of separating the fluid pipe in the pipe axis direction, by pressing the locking member against the outer peripheral surface of the fluid pipe via a contact member (an interposition member), the wedge portions are caused to bite into the fluid pipe to prevent the separation of the fluid pipe in the pipe axis direction (for example, see Japanese Utility Model Publication No. 4-1434 (Page 3, FIG. 6))

Patent Document 1: Utility Model Publication No. 58-31027 (page 3, FIG. 3)

Patent Document 2: Utility Model Publication No. 52-166815 (page 3, FIG. 3)

Patent Document 3: Japanese Patent Laid-Open No. 2005-3207 (pages 5 to 7, FIGS. 1 to 4)

Patent Document 4: Utility Model Publication No. 4-1434 (Page 3, FIG. 6)

However, in Utility Model Publication No. 58-31027 (page 3, FIG. 3), when the external force caused by the earthquake or the like is repeatedly generated in a direction of separating the fluid pipe, and on the contrary, in a direction of inserting the fluid pipe, since the intermediary member (the interposition member) disposed in the recess portion without a gap in the pipe axis direction is locally concentrated on a contact surface between the pressing member and the locking member by the repeated external force in the pipe axis direction, and collides with the contact surface several times, there is a fear of damage to collision locations of these members, and consequentially there is a problem in that the separation preventing function of the fluid pipe is significantly impaired.

Moreover, in Utility Model Publication. No. 52-166815 (page 3, FIG. 3), when the external force due to earthquake or the like acts in a direction of separating the original pipe, the locking piece tilts, a front locking claw (an original pipe end portion side) is pressed firmly compared to a rear locking claw (an original pipe opposite end portion side), the pressing force is concentrated on the front locking claw, there is a risk of the front locking claw too deeply biting into the original pipe, and there is a problem in that the outer peripheral surface of the original pipe and an inner surface lining may be damaged, thereby shortening the life of the original pipe.

Moreover, in Japanese Patent Laid-Open No. 2005-3207 (pages 5 to 7, FIGS. 1 to 4), since a central portion of the retaining member is restricted between the pressing ring and the pressing bolt, the pressing force from the pressing bolt is concentrated on the projection of the central portion of the retaining member. Meanwhile, since a peripheral side portion extending to a side portion of the retaining member is not held by the pressing bolt and the peripheral side portion of the retaining member becomes a state of a cantilever, the peripheral side portion is deformed, and there was a fear of insufficient pressing of the projection of the peripheral side portion against the fluid pipe. As a result, there was a problem in that force is concentrated on the projection of the central portion of the retaining member, the projection excessively bites into the pipe spigot, thereby locally damaging the lining of the pipe spigot, and meanwhile, the peripheral side portion of the retaining member is deformed, and the projection of the peripheral side cannot sufficiently bite into pipe spigot.

Furthermore, in Japanese Utility Model Publication No. 4-1434 (Page 3, FIG. 6), since the retainer (the locking member) is housed in the recess portion in a state of being biased in a circumferential direction of the fluid pipe only at one point by the holder (the elastic body), the retainer (the locking member) in the recess portion of the initial assembling stage is liable to become unstable, and at the time of assembling the separation preventing device with respect to the pipe spigot (the fluid pipe), there is a problem in that the locking member and the interposition member may fall out of the recess portion.

Furthermore, in order to prevent the locking member and the interposition member from falling out of the recess portion, when increasing the elastic force by changing a material or a shape of the elastic body since the elastic body still applies high elastic force to the locking member after assembling, when the external force due to an earthquake or the like is generated in a direction of separating the fluid pipe, there is a problem in that the locking member does not tilt at a predetermined angle and it is not possible to exhibit the locking force as designed.

The present invention has been made in view of such problems, and an object thereof is to provide a separation preventing device of a fluid pipe that is able to prevent the excessive biting of the wedge portion of the locking member into the fluid pipe and is able to prevent the fluid pipe, the locking member, the pressing member, and the interposition member from being locally concentrated and colliding with one another to prevent damage to these members even when the external force due to earthquake or the like and the repeated external force generated in the pipe axis direction act in a direction of separating the fluid pipe, and is able to firmly maintain the separation preventing function of the fluid pipe.

The present invention has been made in view of such problems, and an object thereof is to provide a separation preventing device of a fluid pipe in which the locking member can be stably housed without falling out of the recess portion, and the locking member after assembling can exhibit the locking force as designed.

SUMMARY OF THE INVENTION

In order to solve the above-described problems, according to the present invention, there is provided a separation preventing device of a fluid pipe and pipe joint that prevents separation of a fluid pipe in a pipe axis direction, the separation preventing device including: a main body member that is externally fitted to an outer peripheral surface of the fluid pipe and has a recess portion facing the outer peripheral surface; a locking member that is housed in the recess portion in a tiltable manner and is able to bite into the outer peripheral surface of the fluid pipe; a pressing unit that is provided in the main body member and presses the locking member so as to bite into the outer peripheral surface of the fluid pipe; and an interposition member interposed between the locking member and the pressing member, wherein the interposition member is equipped with a tapered surface coming into contact with an outer surface of the locking member, and is housed in the recess portion in a state of having an acceptable movement value of a predetermined width in the pipe axis direction of the fluid pipe.

According to this feature, even when the external force of separating or inserting in the pipe axis direction is applied to the fluid pipe, as the interposition member between the locking member and the pressing member moves in the recess portion of the main body member in the pipe axis direction by an acceptable value of a predetermined width, the tapered surface of the interposition member changes a contact portion with the outer surface of the locking member. Accordingly, even when the external force in the pipe axis direction of separating and inserting the fluid pipe is repeated, since it is possible to disperse the mutual contact locations of the locking member, the pressing member, and the interposition member, without being locally concentrated to one another while colliding with one another, it is possible to prevent damage to these members due to the repeated concentration collision and to firmly hold the separation preventing function of the fluid pipe, thereby being able to satisfactorily hold a piping structure of the initial connection.

In the separation preventing device of the fluid pipe and pipe joint of the present invention, the outer surface of the locking member may be formed on the inclined surface that comes into contact with the tapered surface of the interposition member substantially in parallel.

According to this feature, since both the tapered surface of the interposition member and the inclined surface of the locking member come into contact with each other substantially in parallel in a tilting state, it is possible to ward off the external force by the sliding-contact between the parallel surfaces tilting with respect to the pipe axis direction, without directly receiving the external force acting in the pipe axis direction.

In the separation preventing device of the fluid pipe and pipe joint of the present invention, the interposition member may be equipped with a pressing target surface that comes into contact with the pressing surface of the pressing member in a tiltable manner.

According to this feature, as the interposition member moves in the recess portion of the main body member by an acceptable value of a predetermined width in the pipe axis direction, by tilting the interposition member with respect to the pressing member, it is possible to hold the pressing force so that the locking member, the interposition member, and the pressing member are not separated from one another, even by the movement of the interposition member.

In the separation preventing device of the fluid pipe and pipe joint of the present invention, the pressing member may be provided in the main body member so as to be movable back and forth in a radial direction of the fluid pipe.

According to this feature, since the pressing member is provided on the main body member so as to be movable back and forth in the radial direction of the fluid pipe, during operation of moving the pressing member back and forth in the radial direction, an operating means such as a tool is not interfered by the outer surface of the fluid pipe.

In the separation preventing device of the fluid pipe and pipe joint of the present invention, a rear edge of the pressing surface of the pressing member, a rear end surface of the interposition member, and a rear end surface of the locking member may be sequentially disposed from the rear in the pipe axis direction of the fluid pipe.

According to this feature, since the interposition member does not contact with the rear edge of the pressing surface of the pressing member, it is possible to prevent damage to the rear edge, and it is possible to vary a tilting center of the interposition member and a tilting center of the locking member in the pipe axis direction. Accordingly, it is possible to increase the variation of the tilting aspect of the interposition member and the locking member and always press the locking member in response to various directions and magnitudes of the external force.

In the separation preventing device of the fluid pipe and pipe joint of the present invention, the locking member has a plurality of wedge portions in a front-back direction of a pipe axis of the fluid pipe, and is equipped with a projection portion that regulates biting of a front wedge portion of the plurality of wedge portions into the fluid pipe, when the fluid pipe moves to a separation side in the pipe axis direction.

According to this feature, when the fluid pipe moves in the direction of being separated, among the plurality of wedge portions provided in the front-back direction of the fluid pipe axis direction, a wedge portion provided on a front side bites into the fluid pipe, but biting of the front wedge portion is regulated by the projection portion provided in the locking member. Accordingly, the excessive biting of the front wedge portion into the fluid pipe is suppressed, thereby being able to prevent the damage to the fluid pipe.

In the separation preventing device of the fluid pipe and pipe joint of the present invention, the projection portion may be provided between the front wedge portion and the rear wedge portion of the plurality of wedge portions.

According to this feature, since the projection portion is provided between the front wedge portion and the rear wedge portion, after the front wedge portion somewhat bites into the fluid pipe, the projection portion regulates biting of the front wedge portion into the fluid pipe, and thus, it is possible to prevent the front wedge portion from excessively biting into the fluid pipe.

In the separation preventing device of the fluid pipe and pipe joint of the present invention, the projection portion may be a wedge portion that bites into the fluid pipe at least by tilting.

According to this feature, in addition to the front wedge portion that bites into the fluid pipe at least by tilting, since the projection portion also bites into the fluid pipe at least by tilting, the front wedge portion and the projection portion are able to firmly prevent the separation of the fluid pipe in the pipe axis direction in combination.

In the separation preventing device of the fluid pipe and pipe joint of the present invention, a leading end of the projection portion does not project from a line that connects a leading end of the front wedge portion and a leading end of the rear wedge portion.

According to this feature, since the leading end of the projection portion does not project from the line that connects the leading end of the front wedge portion and the leading end of the rear wedge portion, after the front wedge portion bites into the fluid pipe by tilting, the projection portion bites into the fluid pipe. Accordingly, it is also possible to prevent the front wedge portion from excessively biting into the fluid pipe and to adjust the amount of biting of the front wedge portion by adjusting the amount of projection of the leading end of the projection portion.

In the separation preventing device of the fluid pipe of the present invention, the wedge portion may tilt to a front side in the pipe axis direction of the fluid pipe.

According to this feature, since the wedge portion tilts to the front side in the pipe axis direction of the fluid pipe, it is possible to reliably prevent the movement of the fluid pipe to the separation side in the pipe axis direction.

In the separation preventing device of the fluid pipe and pipe joint of the present invention, the locking member may have a central portion, a peripheral side portion extending to a lateral side of the central portion, and is equipped with a contact portion with which the peripheral side portion and the recess portion come into contact in a state in which the central portion of the locking member and the recess portion are spaced apart from each other.

According to this aspect, when the fluid pipe moves in the separation direction, the peripheral side portion of the locking member is supported by the contact portion, in a state in which the deformation of the peripheral side portion of the locking member is suppressed, the wedge portion of the peripheral side portion can reliably bite into the pipe spigot. Meanwhile, in the state in which the central portion of the locking member and the recess portion are spaced from each other, the wedge portion of the central portion is able to moderately bite into the pipe spigot, and it is possible to prevent damage to the lining of the fluid pipe.

In the separation preventing device of the fluid pipe and pipe joint of the present invention, the peripheral side portion of the locking member may be equipped with a peripheral side portion inclined surface that tilts toward an inner side in a radial direction of the fluid pipe and toward a front side in the pipe axis direction of the fluid pipe from the contact portion.

According to this aspect, since the peripheral side portion of the locking member is equipped with the peripheral side portion inclined surface that tilts toward an inner side in a radial direction of the fluid pipe and toward a front side in the pipe axis direction of the fluid pipe from the contact portion, even after the peripheral side portion comes into contact with the recess portion, the locking member can further tilt and can further bite into the pipe spigot. Accordingly, it is possible to firmly prevent the separation of the fluid pipe in the pipe axis direction.

In the separation preventing device of the fluid pipe and pipe joint of the present invention, a dimension in the pipe axis direction of the central. Portion of the locking member may be formed to be greater than a dimension in the pipe axis direction of the peripheral side portion of the locking member.

According to this feature, since the dimension in the pipe axial direction of the central portion of the locking member is formed to be greater than the dimension in the pipe axis direction of the peripheral side portion, it is possible to reliably hold the bending moment applied to the peripheral side portion of the locking member.

In the separation preventing device of the fluid pipe and pipe joint of the present invention, the recess portion may be equipped with a pressing wall coming into contact with the peripheral side portion of the locking member, and a rear side wall facing the central portion of the locking member.

According to this feature, since the recess portion is equipped with the pressing wall coming into contact with the peripheral side portion of the locking member, and the rear side wall facing the central portion of the locking member, when the fluid pipe moves in the separation direction, the peripheral side of the locking member is supported while coming into contact with the pressing wall of the recess portion, and thus, it is possible to reduce the deformation of the peripheral side portion. Since the central portion of the locking member faces the rear side wall of the recess portion, the wedge portions of the central portion press the pipe spigot, while allowing the moderate movement and tilting. Accordingly, it is possible to prevent the excessive biting into the pipe spigot and to prevent damage to the lining of the pipe spigot.

In the separation preventing device of the fluid pipe and pipe joint of the present invention, wherein at an end portion of the locking member in a circumferential direction of the fluid pipe, a fitting groove configured to fit an anti-falling elastic body of the locking member from the recess portion is formed tapering toward an outer diameter direction of the fluid pipe.

According to this aspect, since the elastic restoring force of the elastic body fitted to the fitting groove formed tapering toward the outer diameter direction of the fluid pipe acts stronger as it goes toward the outer diameter side, the locking member can be reliably housed without falling out of the recess portion, and furthermore when the locking member housed in the recess portion moves or tilts, since the elastic body fitted into the fitting groove follows the movement of the locking member, the elastic body is not detached from the recess portion and does not affect the movement and tilting of the locking member, and thus, the locking member can move or tilt as designed.

In the separation preventing device of the fluid pipe and pipe joint of the present invention, the fitting grooves may be formed between a plurality of wedge portions provided on the locking member.

According to this feature, since it is possible to form the fitting groove by effectively utilizing a space between the plurality of wedge portions without dominating the regions of the several wedge portions, the locking capability of the locking member is not affected.

In the separation preventing device of the fluid pipe and pipe joint of the present invention, the fitting grooves of the locking member may be formed to penetrate in a radial direction of the fluid pipe.

According to this aspect, since the elastic body elastically deformed in the penetration direction of the fitting groove comes into contact with the recess portion inner wall or the outer surface of the fluid pipe, the elastic body can be made to function as a cushioning material.

A pipe joint of the present invention includes the fluid pipe, a pipe socket into which a front end portion of the fluid pipe is inserted, and a separation preventing device of a fluid pipe that prevents separation of the fluid pipe from the pipe socket.

According to this feature, since it is possible to firmly prevent the separation of the fluid pipe from the pipe socket using the separation preventing device of the fluid pipe, it is possible to provide a pipe joint having excellent earthquake resistance and elasticity.

DESCRIPTION OF THE PREFERRED EMBODIMENTS

Hereinafter, embodiments for carrying out a separation preventing device according to the present invention will be described based on the examples.

Example 1

A separation preventing device according to the example 1 will be described with reference to FIGS. 1 to 8. Hereinafter, the description will be provided by assuming that an insertion side of a pipe spigot 2 of FIG. 1 to a pipe socket 3 is a front side (front) in a pipe axis direction, and a separation side of the pipe spigot 2 from the pipe socket 3 is a rear side (rear) in the pipe axis direction.

Figure 1:
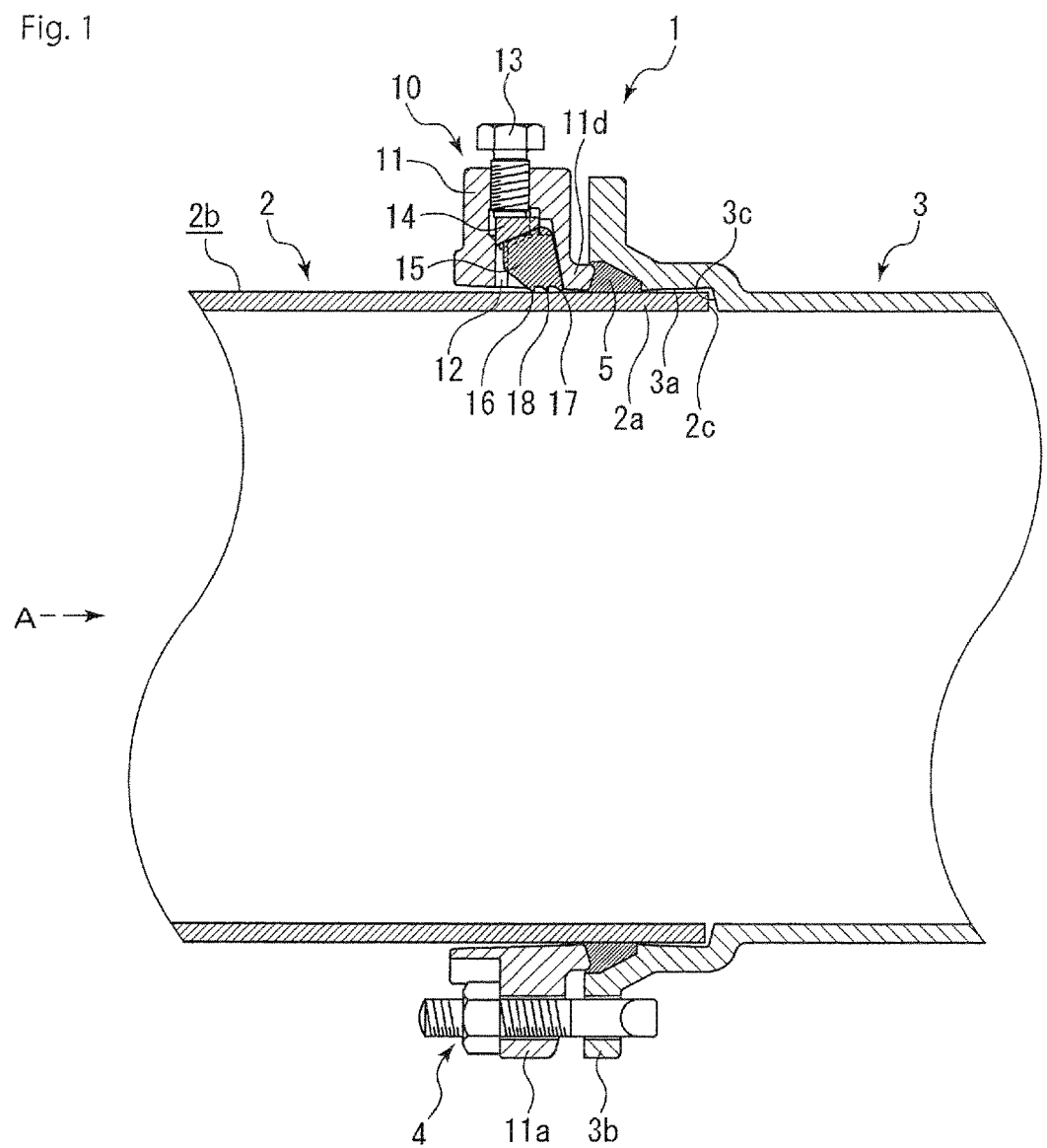
FIG. 1 is a side cross-sectional view of a pipe joint equipped with a separation preventing device in an exemplary embodiment.

As illustrated in FIG. 1, a pipe joint 1 of the present example is equipped with the pipe socket 3 having a receiving unit. 3a formed at an end portion thereof, a pipe spigot 2 as a fluid pipe of the present invention inserted into the receiving unit 3a, a separation preventing device 10 provided on an outer peripheral surface 2b of the pipe spigot 2, and sealing member 5 disposed between an inner circumferential surface of the receiving unit 3a and the outer peripheral surface 2b of the insertion unit 2a along a circumferential direction. Furthermore, the sealing member 5 is pressed in the pipe axis direction by an annular convex portion 11d formed in a main body member 11 to be described later, the sealing member 5 comes into close contact with the inner circumferential surface of the receiving unit 3a and the outer peripheral surface 2b of the insertion unit 2a, and thus, the pipe socket 3 and the pipe spigot 2 are connected to each other in a sealing manner.

Furthermore, the pipe joint 1 of the present invention is a part of a pipe constituting a pipe network, and the pipe socket 3 and the pipe spigot 2 buried in the ground are, for example, made of ductile cast iron for water supply, and the inner peripheral surface of the pipe is coated with a mortar layer. Furthermore, the fluid pipe according to the present invention may be made of metal, such as another cast iron and steel, asbestos, concrete, polyvinyl chloride, polyethylene, polyolefin or the like. Furthermore, the inner peripheral surface of the fluid pipe may be coated with, for example, epoxy resin or the like, without being limited to a mortar layer, or a suitable material may be coated on the inner peripheral surface of the fluid pipe by powder coating. Moreover, in the present invention, the fluid in the fluid pipe is not limited to the clean water of the present embodiment, and may be, for example, gas, a gas-liquid mixture of gas and liquid, other than industrial water, agricultural water, sewage or the like.

Furthermore, as illustrated in FIG. 1, the separation preventing device 10 according to the present invention disposed on the outer peripheral surface 2b of the pipe spigot 2 is mainly constituted by a main body member 11 that is externally fitted to the outer peripheral surface 2b of the pipe spigot 2 and has a recess portion 12 facing the outer peripheral surface 2b, a locking member 15 that is housed in the recess portion 12 in a tiltable manner and can bite into the outer peripheral surface 2b of the pipe spigot 2, and a pressing unit that is provided in the main body member 11 and includes a bolt 13 and an interposition member 14 as a pressing member configured to press the locking member 15.

The separation preventing device 10 is configured so that the main body member 11 is connected and fixed with respect to the receiving unit 3a by a fastening member 4, and the locking member 15 housed in the recess portion 12 of the main body member 11 is locked on the outer peripheral surface 2b of the pipe spigot 2 as will be described later, which makes it possible to prevent the insertion unit 2a from being separated from the receiving unit 3a. Hereinafter, the members constituting the separation preventing device 10 will be described.

First, the main body member 11 will be described. As illustrated FIGS. 1, 2, and 4, the main body member 11 is a gland of an annular integral member capable of being externally fitted onto the outer peripheral surface 2b of the pipe spigot 2, and is formed by ductile cast iron, stainless steel, steel, cast steel or the like. Furthermore, the main body member of the present invention may have a structure that can be divided into a predetermined number in the circumferential direction. A plurality of the recess portions 12 are circumferentially formed on the inner peripheral portion of the main body member 11 that faces the outer peripheral surface 2b of the pipe spigot 2. The interior of each of the recess portions 12 is a space surrounded by a front side wall 12a and a pressing wall 12b formed in the pipe axis direction of the pipe spigot 2 at a predetermined gap, peripheral walls 12d and 12d formed in the circumferential direction of the pipe spigot 2, and a bottom wall 12c, and the recess portion 12 has a bottom housing unit 12e that houses the interposition member 14. The locking member 15 and the interposition member 14 to be described later are housed in the recess portion 12.

Figure 4:
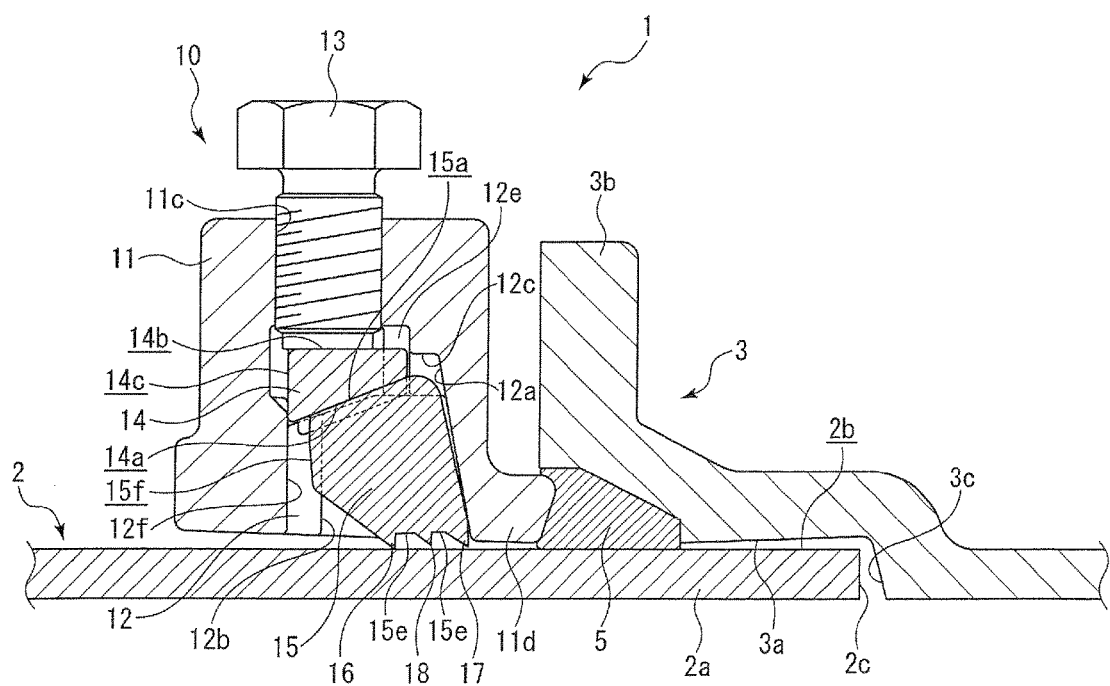
FIG. 4 is a side cross-sectional view of the separation preventing device.
Figure 5:
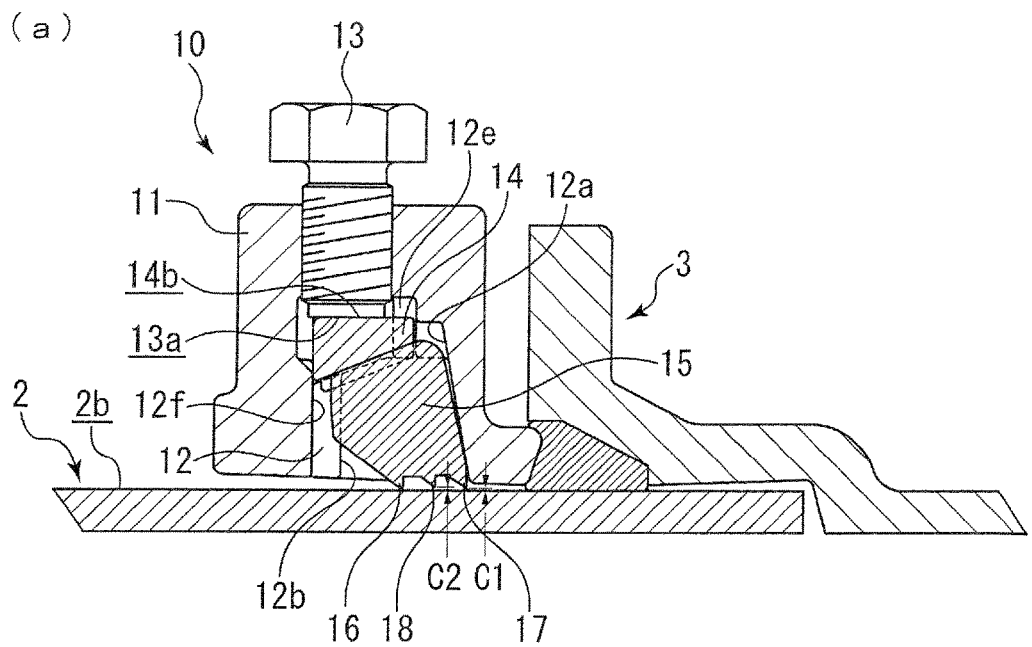
FIG. 5(a) is a side cross-sectional view of the separation preventing device before the initial clamping of the pressing member.
FIG. 5(b) is a side cross-sectional view of the separation preventing device after the initial clamping of the pressing member.
Figure 5:
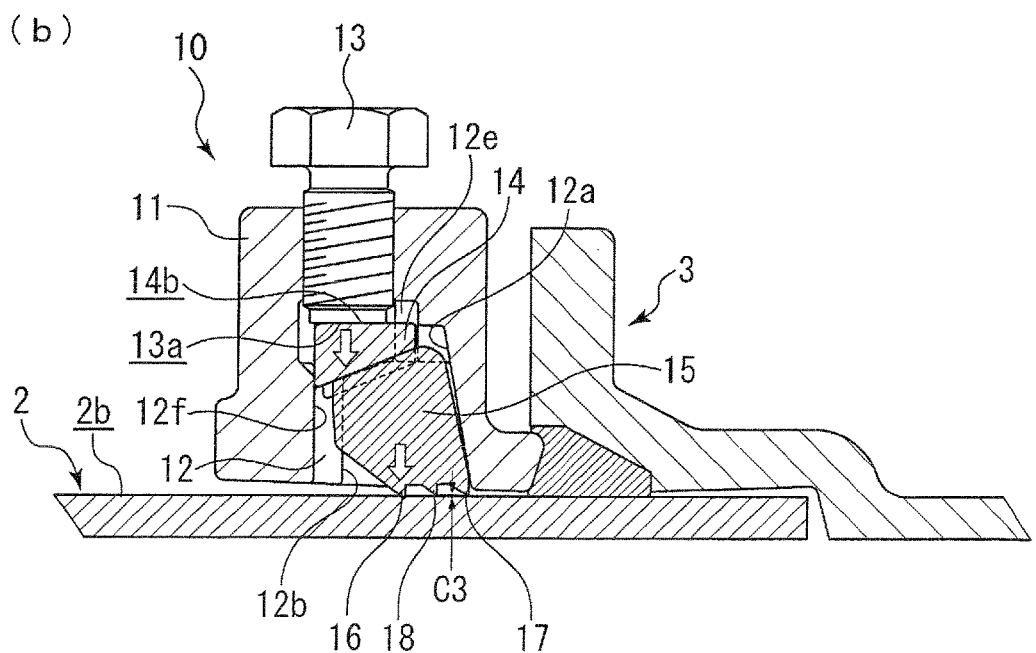
Figure 6:
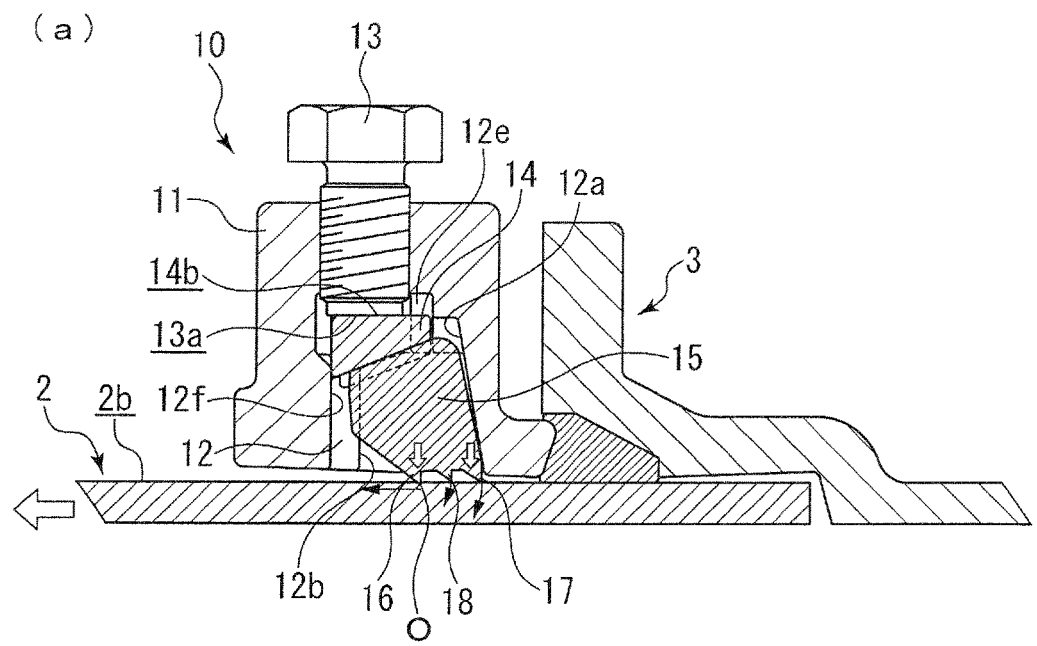
FIG. 6(a) is a side cross-sectional view illustrating the behavior of the separation preventing device when a pipe spigot starts to move to the separation side in the pipe axis direction of the fluid pipe.
FIG. 6(b) is a side cross-sectional view illustrating the behavior of the separation preventing device when the pipe spigot further moves to the separation side in the pipe axis direction of the fluid pipe.
Figure 6:
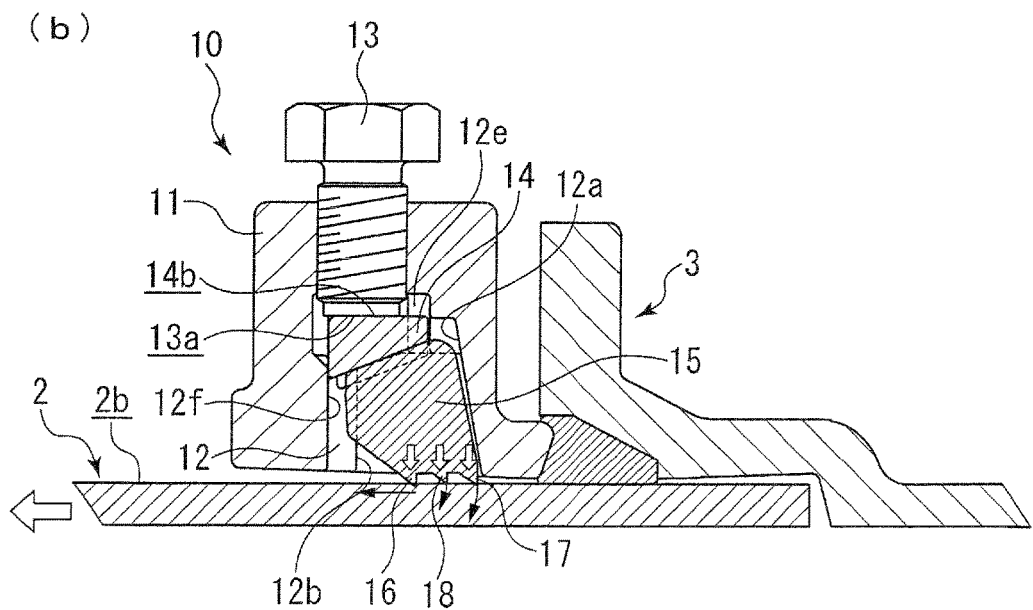

As illustrated in FIGS. 2(a) and 4, the main body member 11 is configured so that a flange unit 11a and a housing unit 11b having the recess portion 12 therein are formed alternately in the circumferential direction, the flange unit 11a is clamped by the flange unit 3b of the pipe socket 3 and the fastening member 4, and the main body member 11 and the pipe socket 3 are integrally fixed. The above-described recess portion 12 is formed on the inner peripheral portion of the housing unit 11b, and a female screw unit 11c is formed on the outer peripheral portion of the housing unit 11b in the radial direction. The bolt 13 as the pressing member of the present invention is screwed into the female screw unit 11c, and by clamping the bolt 13, it is possible to press the locking member 15 against the outer peripheral surface 2b of the pipe spigot 2 via the interposition member 14.

Furthermore, as illustrated in FIGS. 1 and 4, on the end surface of the main body member 11 facing the receiving unit 3a, an annular convex portion 11d configured to presses the sealing member 5 is formed. By clamping the fastening member 4, the sealing member 5 is pressed in the pipe axis direction by the annular convex portion 11d, and the receiving unit 3a and the insertion unit 2a are connected to each other in a sealing manner.

Next, the locking member 15 will be described. As illustrated in FIGS. 3(b) and 4, the locking member 15 has an asymmetrical polygonal shape as viewed in peripheral side view and cross-sectional side view, as illustrated in FIG. 3(a), the locking member 15 is a substantially arcuate member having a predetermined width in the circumferential direction that is equipped with a front wedge portion 17, a rear wedge portion 16, and an auxiliary wedge portion 18 as a projection portion on the inner peripheral portion thereof arcuately. The locking member 15 is made of ductile cast iron, steel, stainless steel or the like. Furthermore, the locking member 15 is formed with a convex portion 15b having an inclined surface 15a on the outer peripheral portion of the center in the circumferential direction, and the inclined surface 15a increases in diameter and tilts so as to be away from the outer peripheral surface 2b of the pipe spigot 2 as it goes toward the front in the pipe axis direction of the pipe spigot 2.

On the side facing the outer peripheral surface 2b of the pipe spigot 2 of the locking member 15, the plurality of wedge portions 16, 17, and 18 are formed in the pipe axis direction at a predetermined gap. The front wedge portion 17 is formed on the front side in the pipe axis direction on which the distance from the outer peripheral surface of the pipe spigot 2 to the inclined surface 15a of the locking member 15 in the pipe radial direction is relatively large, the rear wedge portion 16 is formed on the rear side in the pipe axis direction on which the distance from the outer peripheral surface of the pipe spigot 2 to the inclined surface 15a in the pipe radial direction is relatively small, and the auxiliary wedge portion 18 as the projection portion of the present invention is formed between the front wedge portion 17 and the rear wedge portion 16 in the pipe axis direction.

As illustrated in FIG. 4, the cross-sectional shapes of the respective wedge portions 16, 17, and 18 are a triangular shape including a surface that tilts toward the front side in the pipe axis direction of the pipe spigot 2 and a surface extending outward in the pipe radial direction of the pipe spigot 2 (the outward radial direction) substantially perpendicular to the outer peripheral surface of the pipe spigot 2, and the respective wedge portions 16, 17, and 18 have a tapered shape tilting to the front side in the pipe axis direction toward the outer circumferential surface of the pipe spigot 2 from the proximal end.

Furthermore, as illustrated in FIGS. 2(a), 3(a) and 3(b), the inner diameter dimensions (the radial dimensions as viewed in the pipe axis direction) and the circumferential dimensions of the leading ends of the respective wedge portions 16, 17, and 18 formed in an arc are set to the dimensions biting into the pipe spigot 2 over substantially the entire length in the circumferential direction of the respective wedge portions 16, 17, and 18 when pressing the locking member 15 by the bolt 13 or when the locking member 15 tilts as will be described later. A circumferential length S1 of the front wedge portion 17 and the rear side wedge portion 16 is formed to be substantially equal and is set to be greater than a circumferential length S2 of the auxiliary wedge portion 18 as the projection portion. Furthermore, an amount of projection in an inner diameter direction of the auxiliary wedge portion 18 is set to be smaller than an amount of projection in the inner diameter direction of the front wedge portion 17 and the rear side wedge portion 16, and more specifically, as illustrated in FIGS. 3(a) and 3(b), the leading end of projection in the inner diameter direction of the auxiliary wedge portion 18 formed in an arc is set at a position of a predetermined dimension δ on the outside in the radial direction (the outward radial direction) from the line that connects the leading ends of the front wedge portion 17 and the rear wedge portion 16.

Next, the interposition member 14 will be described. The interposition member 14 constitutes the pressing unit together with the bolt 13 as the pressing member. As illustrated in FIGS. 3(a), 3(b), and 4, the interposition member 14 has a groove portion along the pipe axis direction of the fluid pipe, and the bottom of the groove portion is a tapered surface 14a. The interposition member 14 is provided so that the groove portion covers the convex portion 15b of the locking member 15, the tapered surface 14a of the interposition member 14 and the inclined surface 15a of the convex portion 15b are in contact with each other in a slidable manner, and the locking member 15 is movable along the tapered surface 14a of the interposition member 14 or tiltable in contact with the tapered surface 14a.

Figure 2:
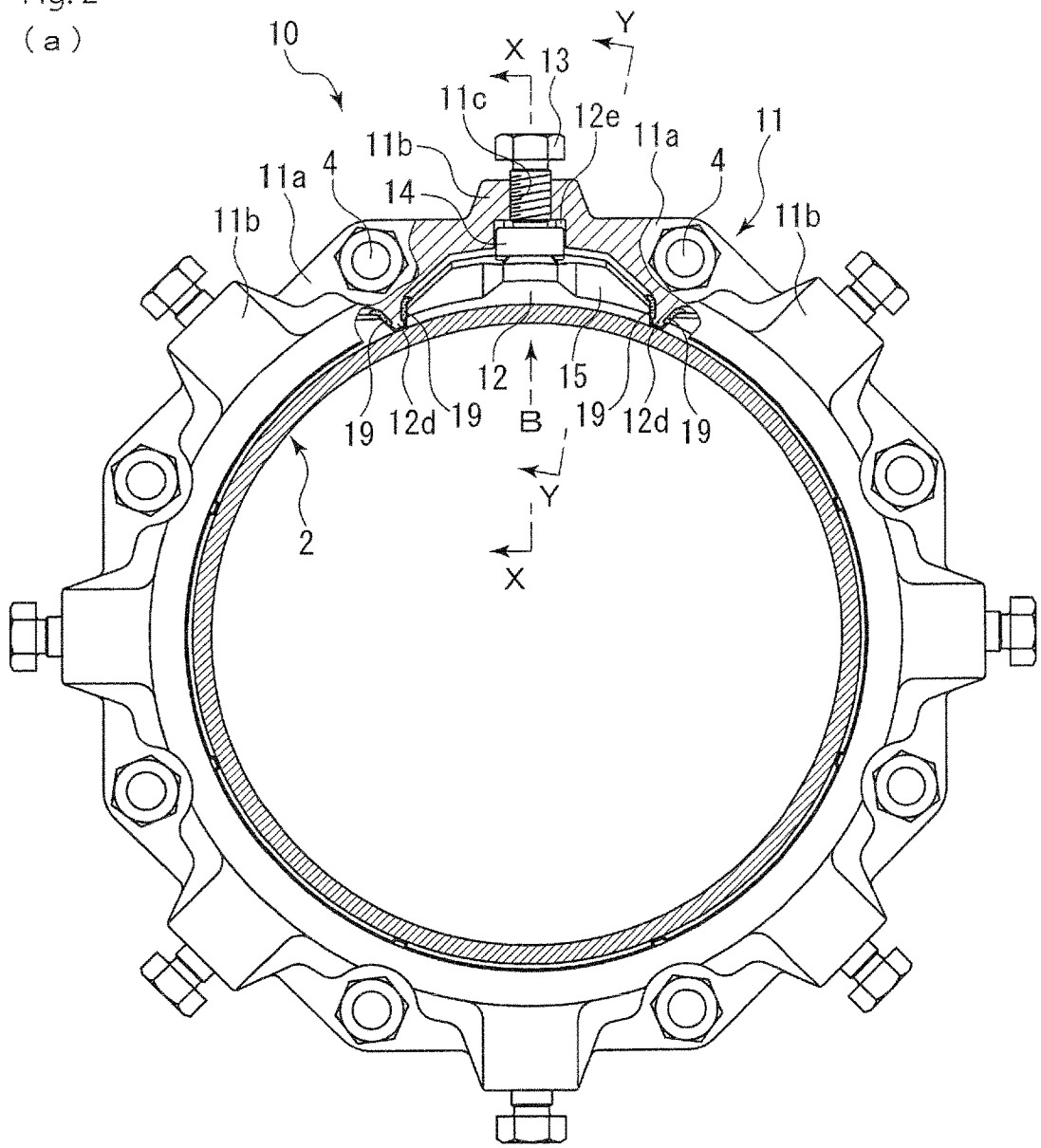
FIG. 2(a) is a partial cross-sectional view of the separation preventing device as viewed from an arrow A of FIG. 1.
FIG. 2(b) is a view as viewed from an arrow B in FIG. 2(a).
Figure 2:
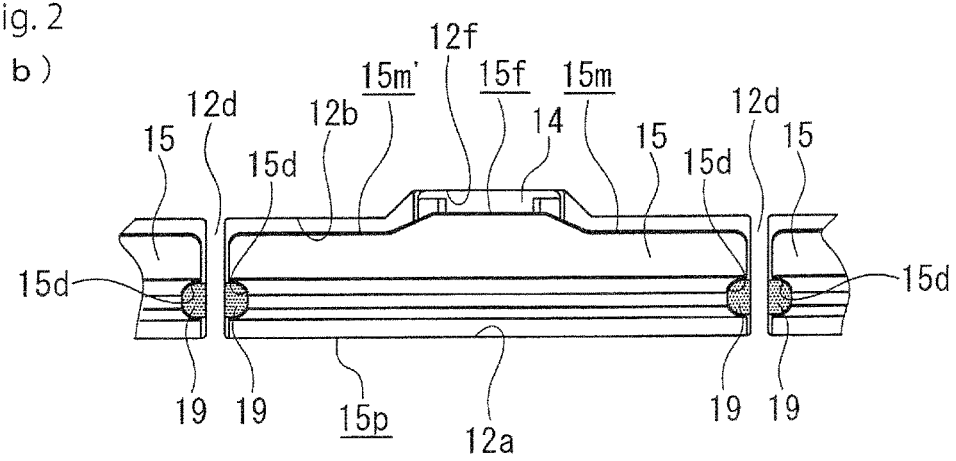

The separation preventing device 10 including the above-described main body member 11, the locking member 15, the bolt 13, and the interposition member 14 is assembled as follows. As illustrated in FIGS. 1, 2 and 4, the interposition member 14 is housed in the bottom housing unit 12e of the main body member 11, in a state of holding an elastic body 19 into a fitting groove 15d of a circumferential end portion of the locking member 15, the locking member 15 is inserted into the recess portion 12 of the main body member 11, and the locking member 15 is held in the recess portion 12. Furthermore, the main body member 11 in which the interposition member 14 and the locking member 15 are housed is externally fitted to the insertion unit 2a of the pipe spigot 2 in a loosely fitted state, and the sealing member 5 is externally fitted to the outer peripheral surface 2b of the insertion unit 2a of the front end side thereof at a predetermined position.

Next, in a state the main body member 11 and the sealing member 5 are externally fitted to the insertion unit 2a, which is inserted into the receiving unit 3a, and the main body member 11 is fastened to the pipe socket 3 while pressing the sealing member 5 between the insertion unit 2a and the receiving unit 3a by the fastening member 4 and is set to an initial assembling position, the bolt 13 screwed into the female screw unit 11c of the housing unit 11b of the main body member 11 is screwed, and the initial clamping of the bolt 13 is performed by predetermined clamping torque.

Next, the behavior of the separation preventing device 10 when force is applied in the separation direction of the pipe axis of the pipe spigot 2 from the start of the initial clamping of the bolt 13 screwed into the main body member 11 will be described.

As illustrated in FIG. 5(a), the center of the bolt 13 screwed into the main body member 11 is set at a position shifted rearward from the center position of the length dimension in the pipe axis direction of the interposition member 14, and at a position shifted to the rear side of the pipe axis from the position of the rear wedge portion 16 of the locking member 15. Furthermore, gaps that allow the movement and tilting of the interposition member and the locking member are formed between the interposition member 14 and the bottom housing unit 12e, and between the locking member 15 and the recess portion 12. For that reason, when the bolt 13 is initially slightly clamped, the interposition member 14 moves to the rear side in the pipe axis direction of the pipe spigot 2 and is set in the state of coming into contact with the rear side wall 12f of the bottom housing unit 12e, or the locking member 15 is set in the state of coming into contact with the front side wall 12a of the recess portion of the main body member 11 while tilting in a counterclockwise direction. Moreover, in the state in which the locking member 15 tilts in the counterclockwise direction, the rear wedge portion 16 slightly comes into contact with the outer peripheral surface 2b of the pipe spigot 2, and the front wedge portion 17 and the auxiliary wedge portion 18 become the non-contact state from the outer peripheral surface 2b of the pipe spigot 2 with clearances c1 and c2, respectively.

Next, as illustrated in FIG. 5(b), when clamping the bolt 13 by predetermined initial clamping torque, since the center of the bolt 13 is shifted to the rear side of the pipe axis from the position of the rear wedge portion 16 of the locking member 15, the initial clamping force due to the bolt 13 is mainly concentrated on the rear wedge portion 16 of the locking member 15, and the rear wedge portion 16 mainly bites into the outer peripheral surface 2b of the pipe spigot 2. Furthermore, the front wedge portion 17 becomes a state of non-contact with the pipe spigot 2 or a state of slight-contact with the pipe spigot 2, and the auxiliary wedge portion 18 maintains the non-contact state with a clearance c3 from the outer peripheral surface 2b of the pipe spigot 2. Furthermore, since the pressing surface 13a of the bolt 13 is formed in a plane, the bolt 13 is able to press a pressing target surface 14b of the interposition member 14 over a wide range, and is able to allow the wedge portions 16, 17, and 18 to equally bite into the outer peripheral surface 2b of the pipe spigot 2 substantially over the entire length of the circumferential length thereof. Accordingly, it is possible to prevent the wedge portions 16, 17 and 18 from unevenly biting into the outer peripheral surface 2b of the pipe spigot 2.

Next, when the separating force is exerted in the pipe axis direction of the pipe spigot 2 from the initial clamping state, as illustrated in FIG. 6(a), an O point of the biting portion of the pipe spigot 2 of the rear wedge portion 16 of the locking member 15 moves backward in the pipe axis direction together with the pipe spigot 2, and the locking member 15 is pressed from the interposition member 14 by the wedge effect. Then, the locking member 15 tilts about the O point of the rear wedge portion 16 in a clockwise direction, the rear wedge portion 16 and the front wedge portion 17 bite into the outer peripheral surface 2b of the pipe spigot 2, and the auxiliary wedge portion 18 does not come into contact with or slightly come into contact with the outer peripheral surface 2b of the pipe spigot 2. Furthermore, the separating force in the pipe axis direction of the pipe spigot 2 in this state is held by the two wedge portions of the front wedge portion 17 and the rear wedge portion 16 of the locking member 15.

When the pipe spigot 2 further moves backward in the pipe axis direction, as illustrated in FIG. 6(b), the amount of biting of the front wedge portion 17 and the rear wedge portion 16 into the outer peripheral surface 2b of the pipe spigot 2 further increases. Then, the auxiliary wedge portion 18 as the projection portion starts to bite into the pipe spigot 2. When the auxiliary wedge portion 18 starts to bite into the pipe spigot 2, since the pressing force to the locking member 15 from the interposition member 14 is also held by the auxiliary wedge portion 18, biting of the front wedge portion 17 into the outer peripheral surface 2b is regulated. Furthermore, in this state, the separating force in the pipe axis direction of the pipe spigot 2 is held by the three wedge portions of the front wedge portion 17, the rear wedge portion 16, and the auxiliary wedge portion 18 as the projection portion.

Figure 7:
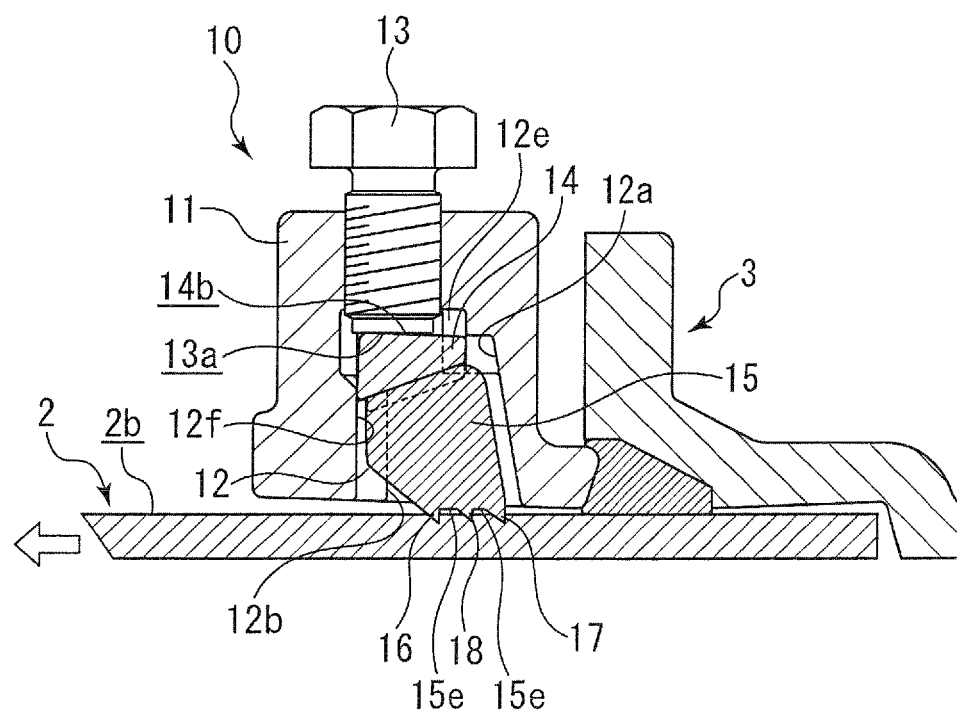
FIG. 7 is a side cross-sectional view illustrating a final state of the behavior of the separation preventing device when the pipe spigot moves to the separation side in the pipe axis direction of the fluid pipe.
Figure 8:
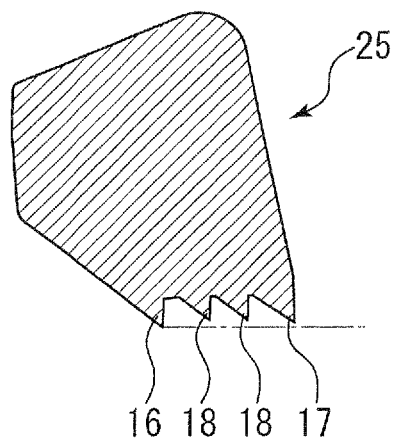
FIG. 8(a) is a side cross-sectional view illustrating a modified example of the locking member.
FIG. 8(b) is a side cross-sectional view illustrating another modified example of the locking member.
Figure 8:
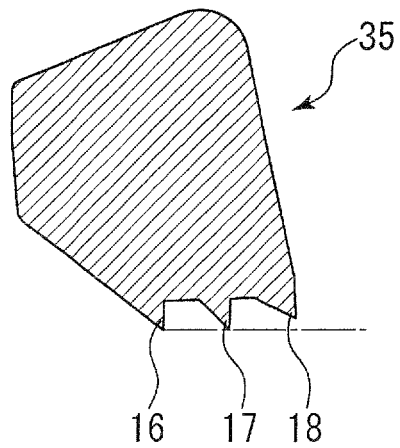
Figure 9:
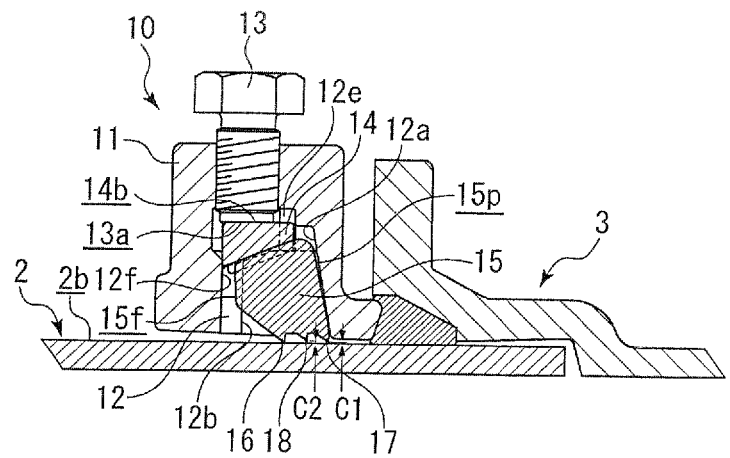
FIG. 9(a) is a side cross-sectional view of the separation preventing device before an initial clamping of the pressing member taken from a cross-section X-X of FIG. 2
FIG. 9(b) is a side cross-sectional view taken from a cross-section Y-Y.
Figure 9:
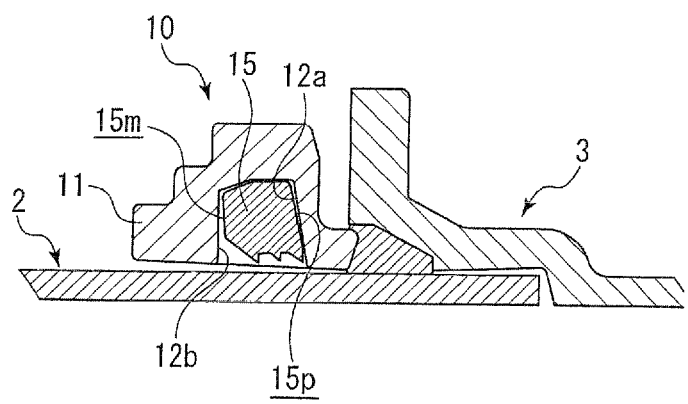

Moreover, the locking member 15 is pressed by the interposition member 14, and finally, as illustrated in FIG. 7, the three wedge portions of the front wedge portion 17, the rear wedge portion 16, and the auxiliary wedge portion 18 further bite into the pipe spigot 2, and the separating force in the pipe axis direction of the pipe spigot 2 matches with the locking force generated in each of the wedge portions 16, 17, and 18, thereby being able to hold the separating force in the pipe axis direction of the pipe spigot 2.

Furthermore, the shapes and the dimensions of the wedge portions are set with a sufficient margin with respect to the separating force assumed in design.

In particular, even when the separating force assumed in design is applied to the separation preventing device and the wedge portions bite into the pipe spigot 2, bottoms 15e among the wedge portions 16, 17, and 18 are set to be separated without coming into contact with the outer peripheral surface 2b of the pipe spigot 2. If the setting as stated above is not done, it causes a problem when the separating force assumed in design is applied to the separation preventing device, that the bottoms 15e among the wedge portions 16, 17, and 18 are in the state of coming into contact with the outer peripheral surface 2b of the pipe spigot 2, and thus the wedge portions 16, 17, and 18 cannot bite into the pipe spigot 2 anymore and are not able to hold the larger separating force. Furthermore, it causes a problem that the situation where the pipe spigot 2 is subjected to the large pressing force from both the wedge portions 16, 17, and 18 and the bottoms 15e among the wedge portions, and thus the pipe spigot 2 is significantly reduced in diameter, and the linings of the inner peripheral surface and the outer peripheral surface are damaged.

However, the present invention can prevent such the problems because even when the separating force assumed in design is applied to the separation preventing device and the wedge portions bite into the pipe spigot 2, bottoms 15e among the wedge portions 16, 17, and 18 are set to be separated without coming into contact with the outer peripheral surface 2b of the pipe spigot 2.

The separation preventing device of the present invention according to the example 1 exhibits the following effects.

In the state of performing the initial clamping of the bolt 13 screwed to the main body member 11 with respect to the pipe spigot 2, when the separating force is exerted on the pipe spigot 2 in the pipe axis direction, the locking member 15 tilts, and the front wedge portion 17 bites into the pipe spigot 2. Moreover, when the locking member 15 further tilts, the auxiliary wedge portion 18 as the projection portion starts to bite into the pipe spigot 2, biting of the front wedge portion 17 into the pipe spigot 2 is regulated by biting of the auxiliary wedge portion 18, and thus, it is possible to prevent the front wedge portion 17 from excessively biting into the pipe spigot 2. Accordingly, since the pipe spigot 2 is not subjected to the excessive pressure from the front wedge portion 17, the separation preventing device is able to prevent damage to the outer peripheral surface and the linings of the inner surface.

Since the auxiliary wedge portion 18 as the projection portion is provided between the front wedge portion 17 and the rear wedge portion 16, after the front wedge portion 17 somewhat bites into the pipe spigot 2, the auxiliary wedge portion 18 starts biting to regulate the biting of the front wedge portion 17 into the pipe spigot 2, and thus, it is possible to prevent the front wedge portion from locally biting into the pipe spigot 2.

Since the auxiliary wedge portion 18 is the wedge portion that bites into the pipe spigot 2 by tilting of the locking member 15, in addition to the front wedge portion 17 biting into the pipe spigot 2 by tilting, the auxiliary wedge portion 18 also bites into the pipe spigot 2 by tilting. Accordingly, the front wedge portion 17 and the auxiliary wedge portion 18 are able to firmly prevent the separation of the pipe spigot 2 in the pipe axis direction in combination.

Since the leading end of the auxiliary wedge portion 18 does not project from the line that connects the leading end of the front wedge portion 17 and the leading end of the rear wedge portion 16, after the front wedge portion 17 bites into the pipe spigot 2 by tilting, the auxiliary wedge portion 18 bites into the pipe spigot 2. Accordingly, it is possible to prevent the front wedge portion 17 from excessively biting into the pipe spigot 2 and to adjust the amount of biting of the front wedge portion 17 by adjusting the amount of projection of the leading end of the auxiliary wedge portion 18.

The cross-sectional shapes of each of the wedge portions 16, 17, and 18 are a triangle that includes a surface tilting toward the front side in the pipe axis direction of the pipe spigot 2 and a surface extending outward in the radial direction of the pipe spigot 2 (the outward radial direction) substantially perpendicular to the outer peripheral surface 2b of the pipe spigot 2, and have a tapered shape toward the outer peripheral surface of the pipe spigot 2 from its proximal end. Accordingly, each of the wedge portions 16, 17, and 18 easily bites into the outer peripheral surface 2b of the pipe spigot 2, the surface extending outward in the radial direction of the pipe spigot 2 (the outward radial direction) substantially perpendicular to the outer peripheral surface 2b of the pipe spigot 2 can firmly hold the separating force, and thus, it is possible to firmly prevent the separation of the pipe spigot 2 in the pipe axis direction.

Since the pipe joint 1 is equipped with the pipe spigot 2, the pipe socket 3 to which a front end portion 2c of the pipe spigot 2 is inserted, and the separation preventing device 10 that prevents the separation of the pipe spigot 2 from the pipe socket 3, the pipe joint 1 is able to reliably prevent the pipe spigot 2 from being separated from the pipe socket 3.

The example 1 of the present invention have been described above with reference to the drawings, but the specific structure is not limited to these examples, and modifications and additions are also included in the present invention within the scope that does not depart from the scope of the present invention.

For example, in the above-described example 1, the tapered surface of the interposition member and the inclined surface of the locking member were a plane, but is not limited thereto, in order to reduce the contact area between the tapered surface of the interposition member and the inclined surface of the locking member to reduce the friction, although it is not particularly illustrated, the tapered surface of the interposition member may be a concave curved surface, the inclined surface of the locking member may be a convex curved surface, or both the tapered surface of the interposition member and the inclined surface of the locking member may be an uneven curved surface.

Furthermore, in the above-described embodiment 1, one auxiliary wedge portion 18 provided in the locking member 15 is provided between the front wedge portion 17 and the rear wedge portion 16, but as a modified example of the locking member of the present invention, as illustrated in FIG. 8(a), a locking member 25 may be provided with two auxiliary wedge portions 18 and 18 between the front wedge portion 17 and the rear wedge portion 16 so as to be able to further regulate biting of the front wedge portion 17 into the pipe spigot 2. Furthermore, the auxiliary wedge portion of a predetermined number of three or more may be provided between the front wedge portion and the rear wedge portion.

Furthermore, in the above-described embodiment 1, one auxiliary wedge portion 18 provided in the locking member 15 is provided between the front wedge portion 17 and the rear wedge portion 16, but as another modified example of the locking member of the present invention, as illustrated in FIG. 8(b), a locking member 35 may be provided with the auxiliary wedge portion 18 on the front side in the pipe axis direction of the fluid pipe from the front wedge portion 17.

Furthermore, in the above-described embodiment 1, the locking member 15 is pressed by the bolt 13 via the interposition member 14, but is not limited thereto, the locking member 15 may be directly pressed by the bolt 13 instead of using the interposition member, and the locking member 15 may be pressed by the main body member 11.

Example 2

A separation preventing device according to the example 2 will be described with reference to FIGS. 1 to 4 and 9 to 13. In addition, it is not described about the constitution which is the same as the example 1 mentioned above.

As illustrated in FIGS. 3(a) and 3(b), the locking member 15 has a convex portion 15b having an inclined surface 15a formed on an outer peripheral portion of the center in circumferential direction, and the inclined surface 15a increases in diameter and tilts so as to be away from the outer peripheral surface 2b of the pipe spigot 2 toward the front side in the pipe axis direction of the pipe spigot 2. Further, the inclined surface 15a is formed with convex portion end surface 15f that is substantially perpendicular to the pipe axis on the rear side in the pipe axis direction, and the convex portion end surface 15f is connected to the peripheral side portion 15k via the inclined surfaces 15h and 15j. Furthermore, the convex portion end surface 15f makes up a central portion 15g of the present invention.

The peripheral side portion 15k is formed in a substantially arcuate shape having a predetermined circumferential width on either side in the circumferential direction from the central portion 15g. As illustrated in FIG. 2(b), the front side wall 15p of the locking member 15 faces the front side wall 12a of the recess portion 12, the peripheral side portion inclined surface 15m of the peripheral side portion 15k of the locking member faces the pressing wall 12b of the recess portion 12, and as will be described below, the locking member is adapted to be able to move and tilt between the front side wall 12a and the pressing wall 12b of the recess portion 12.

Furthermore, as illustrated in FIG. 12(b), the peripheral side portion inclined surface 15m of the locking member 15 tilts toward the front side in the pipe axis direction of the pipe spigot 2 from the contact portion 15n at a predetermined angle as it goes toward the inner side in the radial direction (the inward radial direction) of the pipe spigot 2.

Hereinafter, the behavior of the separation preventing device 10 when force is applied in the separation direction of the pipe axis of the pipe spigot 2 from the start of the initial clamping of the bolt 13 screwed into the main body member 11 will be described.

As illustrated in FIGS. 9(a) and 9(b), the center of the bolt 13 screwed to the main body member 11 is set at a position shifted to the rear side of the pipe axis from the central position of the length dimension in the pipe axis direction of the interposition member 14, and at a position shifted to the rear side of the pipe axis from the position of the rear wedge portion 16 of the locking member 15. Furthermore, between the interposition member 14 and the bottom housing portion 12e, and between the locking member 15 and the recess portion 12, gaps that allow the movement and tilting of the interposition member and the locking member 15 are formed. For that reason, when initially slightly clamping the bolt 13, the interposition member 14 moves to the rear side in the pipe axis direction of the pipe spigot 2 and is set in the state of slightly coming into contact with the rear side wall 12$f$ of the bottom housing unit 12$e$, or the locking member 15 is set in the state of slightly coming into contact with the front side wall 12$a$ of the recess portion 12 of the main body member 11 while tilting in a counterclockwise direction. Moreover, in the state in which the locking member 15 tilts in the counterclockwise direction, the rear wedge portion 16 slightly comes into contact with the outer peripheral surface 2$b$ of the pipe spigot 2, and the front wedge portion 17 and the auxiliary wedge portion 18 become the non-contact state from the outer peripheral surface 2$b$ of the pipe spigot 2 with clearances c1 and c2, respectively.

Figure 10:
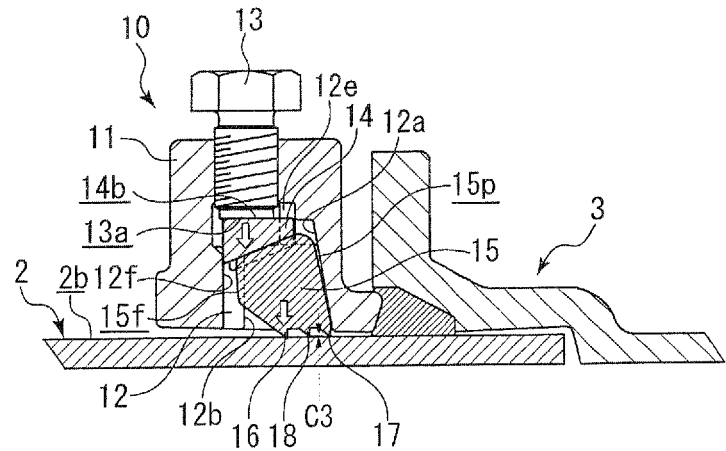
FIG. 10(a) is a side cross-sectional view of the separation preventing device after the initial clamping of the pressing member taken from the cross-section X-X of FIG. 2
FIG. 10(b) is a side cross-sectional view taken from the cross-section Y-Y.
Figure 10:
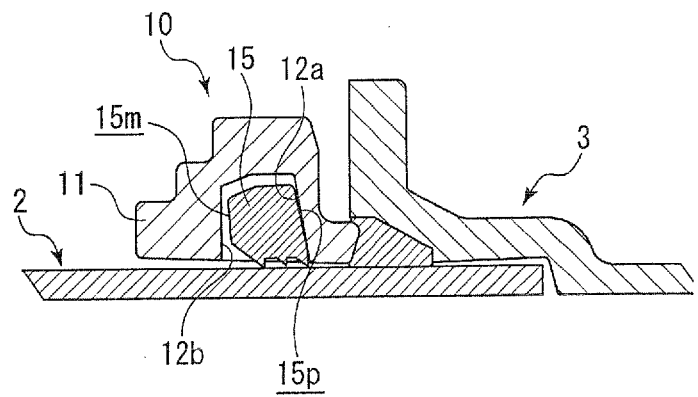

Next, as illustrated in FIGS. 10($a$) and 10($b$), when clamping the bolt 13 by predetermined initial clamping torque, since the center of the bolt 13 is set in the state of being shifted to the rear side of the pipe axis from the position of the rear wedge portion 16 of the locking member 15, the interposition member 11 is strongly pressed against the rear side wall 12$f$ of the bottom housing portion 12$e$ or the front side wall 15$p$ of the locking member 15 is strongly pressed against the front side wall 12$a$ of the recess portion 12, by the initial clamping force due to the bolt 13. At the same time, the initial clamping force due to the bolt 13 is mainly concentrated on the rear wedge portion 16 of the locking member 15, and the rear wedge portion 16 mainly bites into the outer peripheral surface 2$b$ of the pipe spigot 2. Furthermore, the front wedge portion 17 becomes a state of non-contact with the pipe spigot 2 or a state of slight-contact with the pipe spigot 2, and the auxiliary wedge portion 18 maintains the non-contact state with a clearance c3 from the outer peripheral surface 2$b$ of the pipe spigot 2. Furthermore, since the pressing surface 13$a$ of the bolt 13 is formed in a plane, the bolt 13 is able to press a pressing target surface 14$b$ of the interposition member 14 over a wide range, and thus, it is possible to apply the pressing force substantially over the entire length of the circumferential length of the wedge portions 16, 17 and 18.

Figure 11:
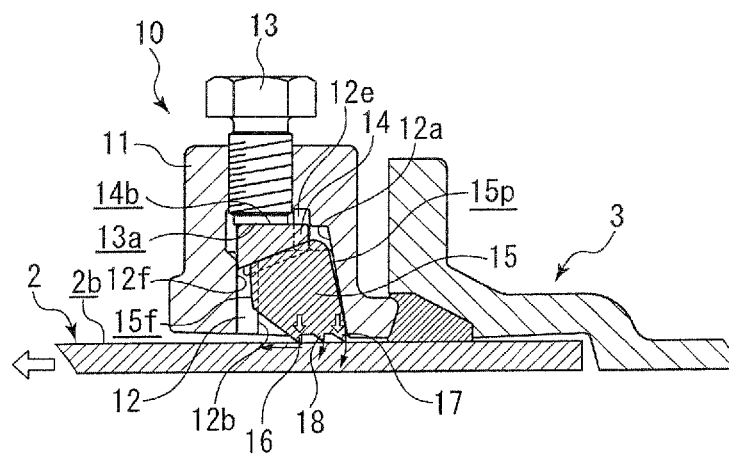
FIG. 11(a) is a side cross-sectional view of the separation preventing device when the pipe spigot starts to move to the separation side in the pipe axis direction taken from the cross-section X-X of FIG. 2.
FIG. 11(b) is a side cross-sectional view taken from the cross-section Y-Y.
Figure 11:
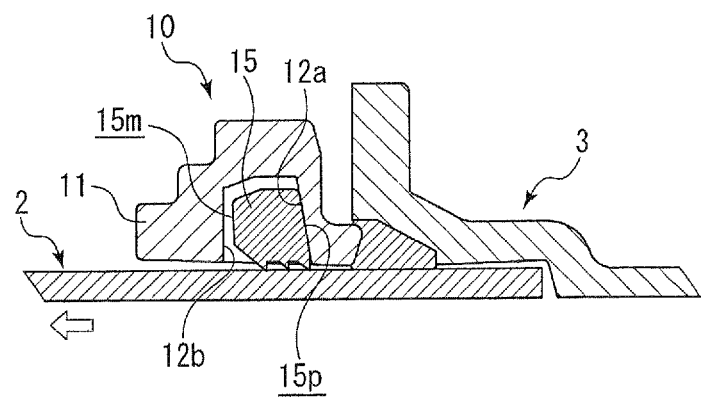

Next, when the separating force is exerted in the pipe axis direction of the pipe spigot 2 from the initial clamping, as illustrated in FIGS. 11($a$) and 11($b$), the point of the biting portion of the pipe spigot 2 of the rear wedge portion 16 of the locking member 15 moves to the rear side in the pipe axis direction together with the pipe spigot 2, and the locking member 15 is pressed by the interposition member 14 by the wedge effect. Moreover, the locking member 15 tilts about the point of the biting portion of the rear wedge portion 16 in the clockwise direction, the rear wedge portion 16 and the front wedge portion 17 bite into the outer peripheral surface 2$b$ of the pipe spigot 2, and the auxiliary wedge portion 18 does not come into contact with or slightly come into contact with the outer peripheral surface 2$b$ of the pipe spigot 2. Furthermore, the separating force in the pipe axis direction of the pipe spigot 2 in this state is held by the two wedge portions of the front wedge portion 17 and the rear wedge portion 16 of the locking member 15.

Figure 12:
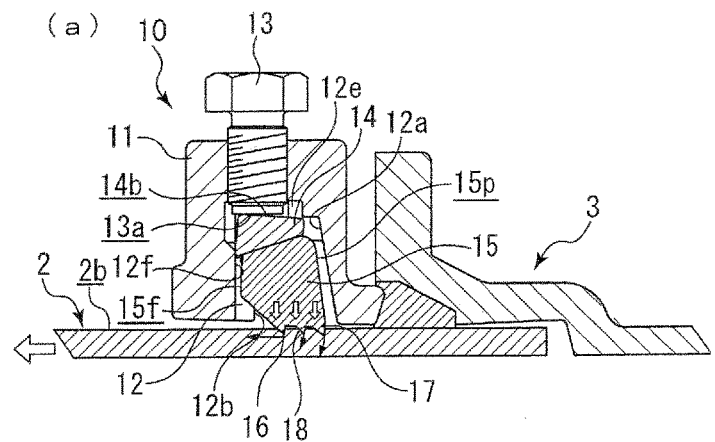
FIG. 12(a) is a side cross-sectional view of the separation preventing device when the pipe spigot further moves to the separation side in the pipe axis direction of the fluid pipe taken from the cross-section X-X of FIG. 2.
FIG. 12(b) is a side cross-sectional view taken from the cross-section Y-Y.
Figure 12:
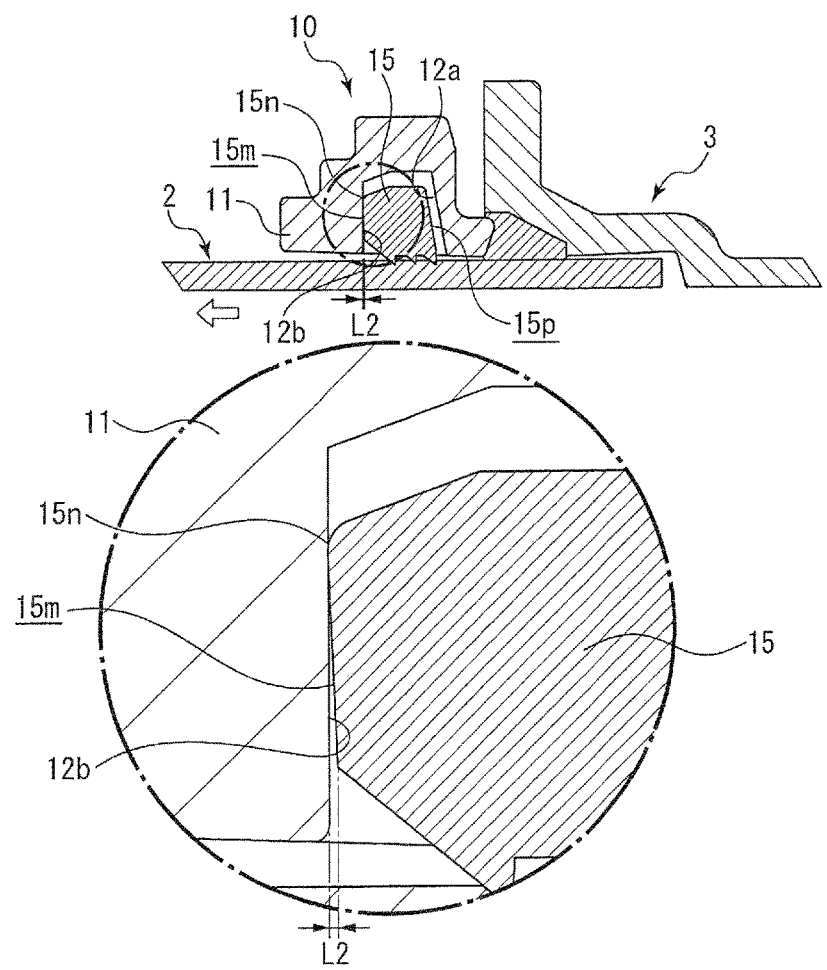

When the pipe spigot 2 further moves to the separation side in the pipe axis direction, as illustrated in FIG. 12($a$), the portion of the biting portion of the pipe spigot 2 of the rear wedge portion 16 of the locking member 15 further moves to the rear side in the pipe axis direction together with the pipe spigot 2, the locking member 15 is pressed by the interposition member 14 by the wedge effect and tilts around the point of the biting portion of the rear wedge portion 16 in the clockwise direction, and the amount of biting of the rear wedge portion 16 and the front wedge portion 17 into the outer peripheral surface 2$b$ of the pipe spigot 2 further increases. Then, the auxiliary wedge portion 18 starts to bite into the pipe spigot 2. When the auxiliary wedge portion 18 starts to bite into the pipe spigot 2, since the pressing force to the locking member 15 from the interposition member 14 is also held by the auxiliary wedge portion 18, biting of the front wedge portion 17 into the outer peripheral surface 2$b$ is regulated. Furthermore, in this state, the separating force in the pipe axis direction of the pipe spigot 2 is held by the three wedge portions of the front wedge portion 17, the rear wedge portion 16, and the auxiliary wedge portion 18.

At the same time, as illustrated in FIG. 12($b$), when the pipe spigot 2 moves to the rear side in the pipe axis direction, the vicinity of the contact portion 15$n$ of the locking member 15 comes into contact with the pressing wall 12$b$ of the recess portion 12, and the movement of the pipe spigot 2 almost stops. Furthermore, when the vicinity of the contact portion 15$n$ of the peripheral side portion 15$k$ of the locking member 15 starts to come into contact with the pressing wall 12$b$ of the recess portion 12, a gap L2 which widens to the inner side in the radial direction of the pipe spigot 2 is formed between the peripheral side portion inclined surface 15$m$ of the locking member 15 and the pressing wall 12$b$ of the recess portion 12.

Figure 13:
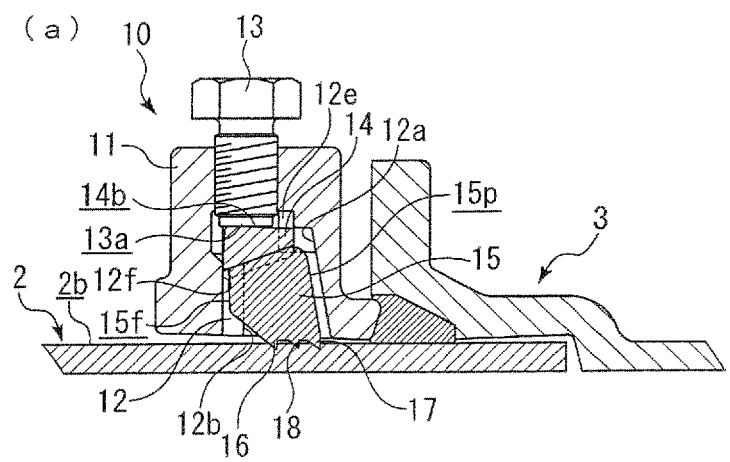
FIG. 13(a) is a side cross-sectional view illustrating a final state of the separation preventing device when the pipe spigot moves to the separation side in the pipe axis direction of the fluid pipe taken from the cross-section X-X of FIG. 2.
FIG. 13(b) is a side cross-sectional view taken from the cross-section Y-Y.
Figure 13:
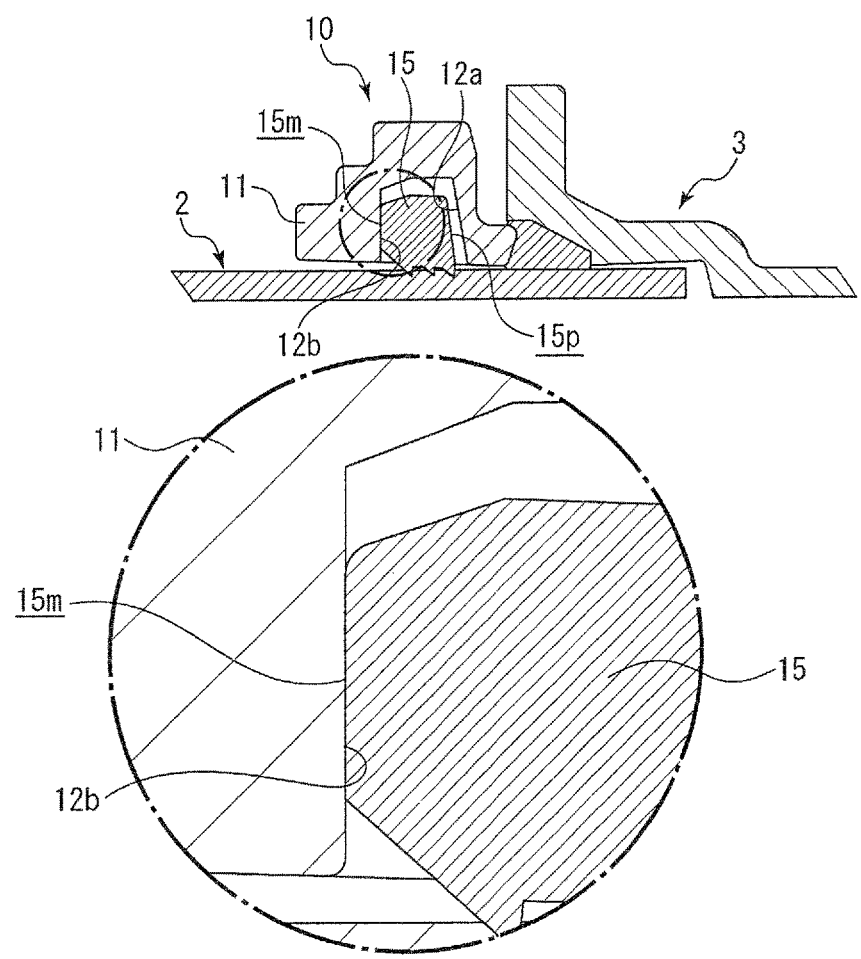
Figure 14:
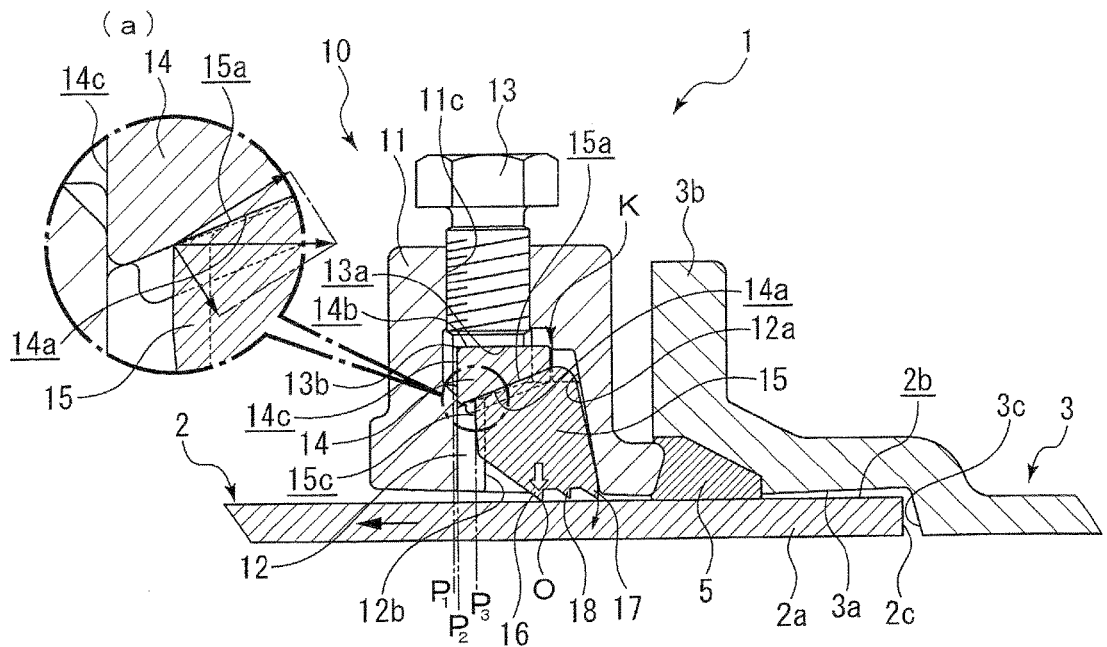
FIG. 14(a) is a side cross-sectional view illustrating the behavior of the separation preventing device when the pipe spigot starts to move from an initial clamping state to a separation side in the pipe axis direction.
FIG. 14(b) is a side cross-sectional view illustrating the behavior of the separation preventing device when the pipe spigot further moves to the separation side in the pipe axis direction of the fluid pipe.
Figure 14:
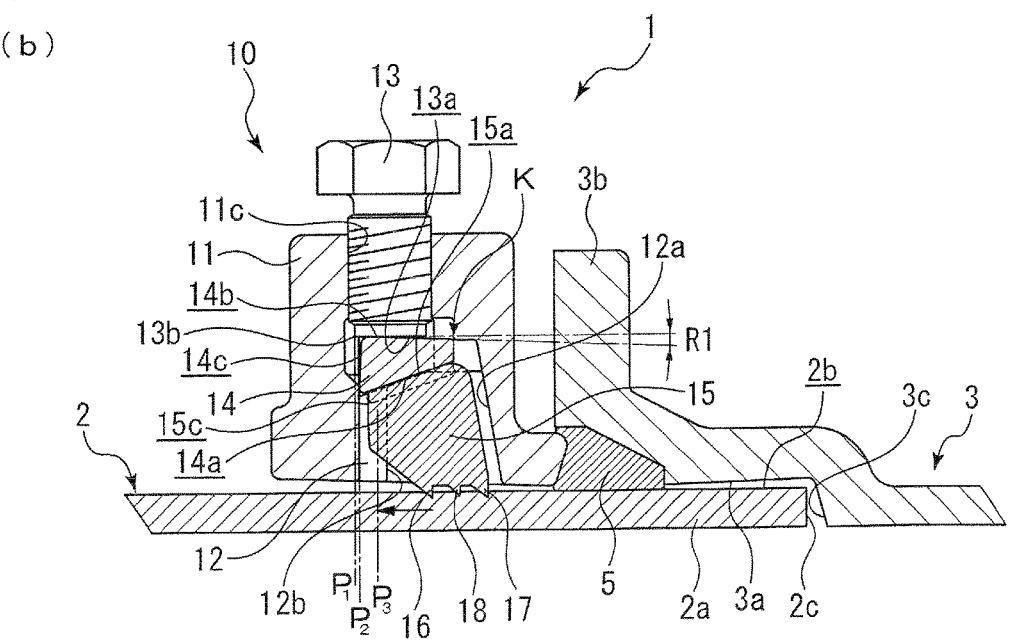
Figure 15:
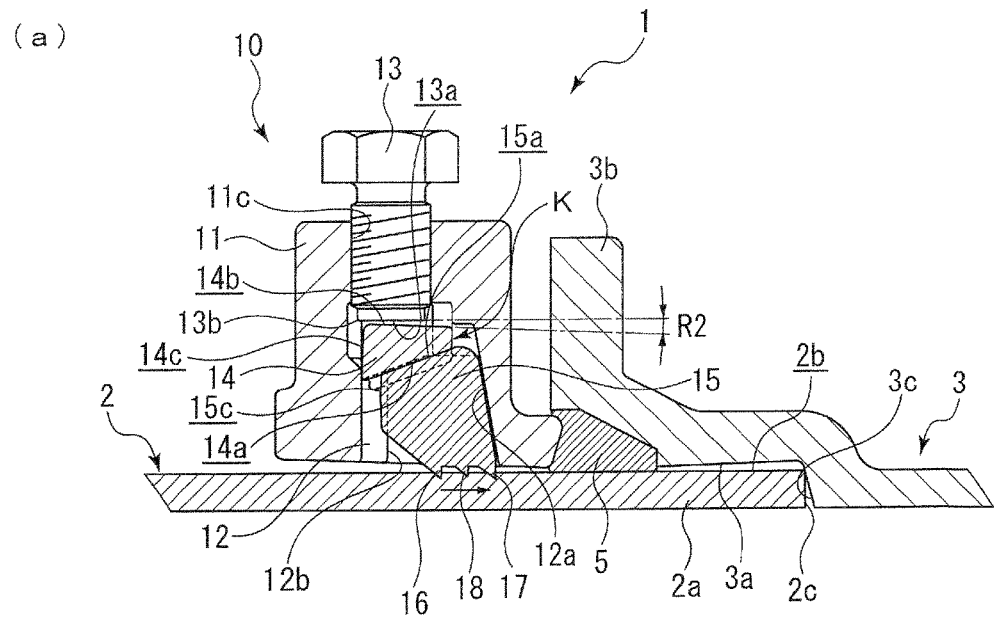
FIG. 15(a) is a side cross-sectional view illustrating the behavior of the separation preventing device when the pipe spigot moves to the insertion side in the pipe axis direction of the fluid pipe.
FIG. 15(b) is a side cross-sectional view illustrating the behavior of the separation preventing device when the pipe spigot moves to the separation side in the pipe axis direction of the fluid pipe again.
Figure 15:
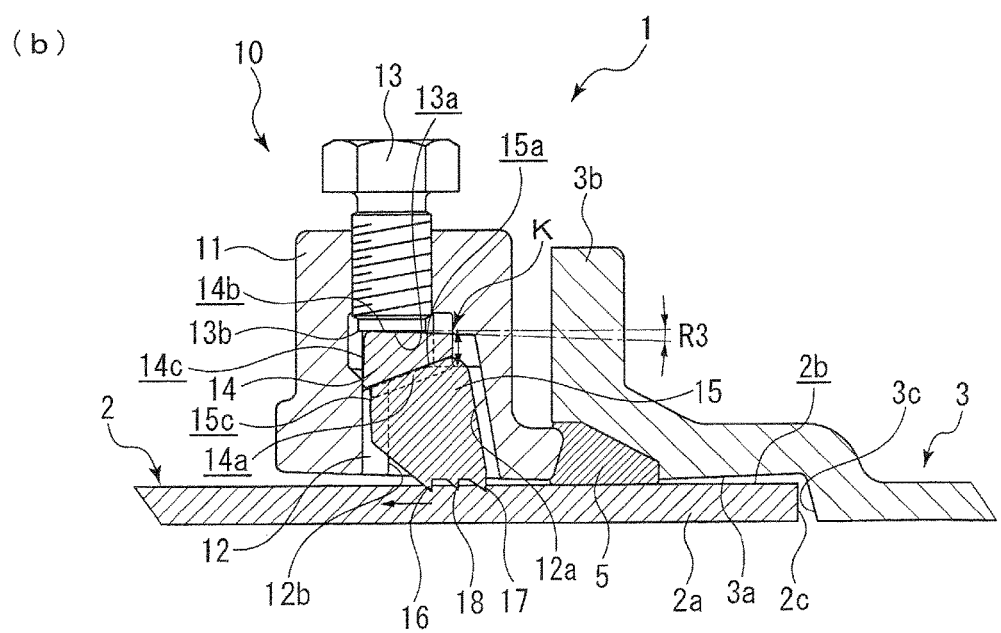

Moreover, as illustrated in FIGS. 13($a$) and 13($b$), finally, the locking member 15 tilts about the vicinity of the contact portion 15$n$ by the pressing force from the interposition member 14 due to the wedge effect, the peripheral side portion inclined surface 15$m$ comes into contact with the pressing wall 12$b$, the movement of the pipe spigot 2 stops, three wedges of the wedge portions 16, 17, and 18 bite into the pipe spigot 2 by tilting around the vicinity of the contact portion 15$n$, and thus, the locking member 15 is able to prevent the separation of the pipe spigot 2 in the pipe axis direction.

The separation preventing device of the present invention according to the example 2 exhibits the following effects.

As illustrated in FIGS. 12($a$) and 13($a$), the convex portion end surface 15$f$ of the central portion 15$g$ of the locking member 15 does not come into contact with the rear side wall 12$f$ of the recess portion 12, while the central portion 15$g$ of the locking member 15 allows the moderate movement and tilting, the wedge portions 16, 17 and 18 near the central portion 15$g$ of the locking member 15 press the pipe spigot 2. Accordingly, it is possible to prevent the excessive biting into the pipe spigot 2. That is, since the central portion 15$g$ of the locking member 15 is directly supported by the bolt 13 and the interposition member 14, the central portion 15$g$ of the locking member 15 is rarely deformed, and so the wedge portion 16, 17 and 18 near the central portion 15$g$ excessively bite into the pipe spigot 2. For this reason, in the state of separating the convex portion end surface 15$f$ of the central portion 15$g$ of the locking member 15 from the rear side wall 12$f$ of the recess portion 12, by weakening the supporting rigidity of the central portion 15$g$ of the locking member 15 to allow the appropriate movement and tilting, it is possible to prevent the excessive biting of the wedge portions 16, 17, and 18 near the central portion 15$g$ of the locking member 15.

In addition, the central portion 15$g$ of the locking member 15 is pressed and supported right above by the bolt 13 and the interposition member 14, but the peripheral side portion 15$k$ of the locking member 15 is not directly supported by the bolt 13 and the interposition member 14. As a result, the peripheral side portion 15$k$ of the locking member 15 becomes a state of a cantilever and is not sufficiently pressed against the pipe spigot 2, and the wedge portions 16, 17 and 18 of the peripheral side portion 15$k$ of the locking member 15 cannot sufficiently bite into the pipe spigot 2.

To solve the problem, as illustrated in FIG. 12(b), when the vicinity of the contact portion 15n of the peripheral side portion 15k of the locking member 15 becomes a state of coming into contact with the pressing wall 12b of the recess portion 12, the peripheral side portion 15k of the locking member 15 becomes a state of being supported by the pressing wall 12b of the recess portion 12, thereby being able to suppress the deformation of the peripheral side portion 15k of the locking member 15. Moreover, as illustrated in FIGS. 13(a), and 13(b), since the locking member 15 tilts about the vicinity of the contact portion 15n in the state in which the deformation of the peripheral side portion 15k of the locking member 15 is suppressed, the wedge portions 16, 17, and 18 near the peripheral side portion 15k of the locking member 15 can reliably bite into the pipe spigot 2, and thus, it is possible to firmly prevent the separation of the pipe spigot 2 in the pipe axis direction.

As illustrated in FIG. 12(b), since the peripheral side portion 15k of the locking member 15 is equipped with the peripheral side portion inclined surface 15m that tilts toward the inner side in the radial direction of the pipe spigot. 2 and toward the front side in the pipe axis direction from the contact portion 15n, even after the peripheral side portion 15k comes into contact with the recess portion 12, the locking member 15 further tilts, and the wedge portions of the peripheral side portion 15k of the locking member 15 can further bite into the pipe spigot 2. Accordingly, it is possible to firmly prevent the separation of the pipe spigot 2 in the pipe axis direction.

Figure 3:
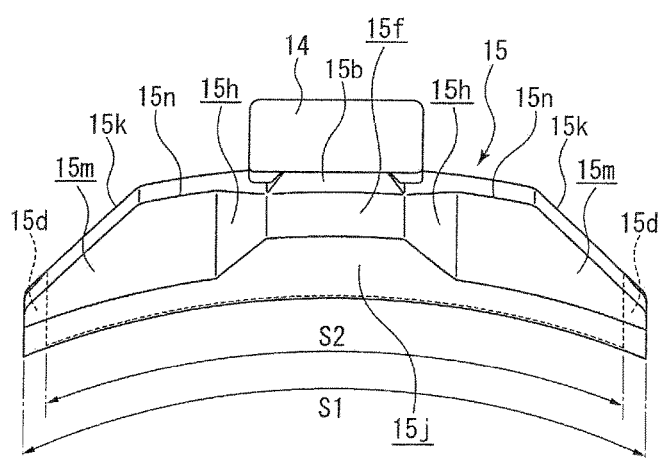
FIG. 3(a) is a front view of a state in which a locking member and an interposition member are combined with each other.
FIG. 3(b) is a partial side cross-sectional view of FIG. 3(a).
Figure 3:
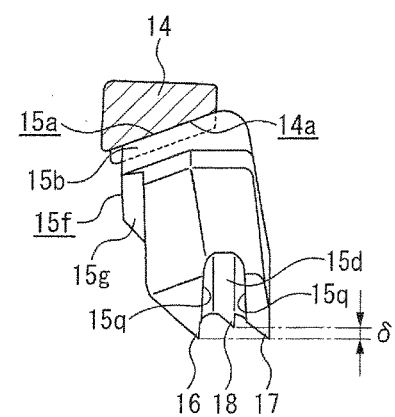

As illustrated in FIG. 3, since the dimension in the pipe axis direction of the central portion 15g of the locking member 15 is formed to be greater than the dimension in the pipe axis direction of the peripheral side portion 15k of the locking member 15, it is possible to reliably hold the bending moment applied to the peripheral side portion 15k of the locking member 15.

Since the recess portion 12 is equipped with the pressing wall 12b coming into contact with the peripheral side portion 15k of the locking member 15, and the rear side wall 12f facing the central portion 15g of the locking member 15, when the pipe spigot moves in the separation direction, the peripheral side portion 15k of the locking member 15 is supported while coming into contact with the pressing wall 12b of the recess portion 12, and thus, it is possible to reduce the deformation of the peripheral side portion 15k. Furthermore, since the central portion 15g of the locking member 15 faces the rear side wall 12f of the recess portion 12, the wedge portions of the central portion 15g press the pipe spigot 2, while being allowed the moderate movement and tilting. Accordingly, it is possible to prevent excessive biting into the pipe spigot 2 and to prevent damage to the lining of the pipe spigot 2.

Example 3

A separation preventing device according to the example 3 will be described with reference to FIGS. 1 to 4 and 14 to 18. In addition, it is not described about the constitution which is the same as the examples 1 and 2 mentioned above.

Hereinafter, the behavior of the pipe joint 1 when the external force such as earthquake is repeatedly applied back and forth in the pipe axis direction with respect to the pipe joint 1 equipped with a separation preventing device 10 described above will be described.

As illustrated in FIG. 14(a), in an initial clamping state before the external force such as earthquake is applied, the pressing force due to the clamped bolt 13 is transmitted to the locking member 15 via the interposition member 14, and at least a rear wedge portion 16 of the locking member 15 bites into the outer peripheral surface of the pipe spigot 2. Furthermore, in the initial state, only the rear wedge portion 16 may bite into the outer peripheral surface of the pipe spigot 2, or a front wedge portion 17 may bite in addition to the rear wedge portion 16.

In this initial clamping state, since the pressing force of the pipe spigot 2 in the radial direction due to the bolt 13 is transmitted by being branched in the pipe axis direction by the surface contact between the tapered surface 14a of the interposition member 14 and the inclined surface 15a of the locking member 15, the interposition member 14 is disposed at the rear in the recess portion 12, and the locking member 15 is disposed at the front in the recess portion 12. That is, in the present embodiment, since the tapered surface 14a of the interposition member 14 and the inclined surface 15a of the locking member 15 are formed in a planar shape tilting substantially in parallel and facing each other in the initial clamping state, the tapered surface 14a and the inclined surface 15a come into surface-contact with each other.

At this time, in order from the rear side in the pipe axis direction, each of the members 13, 14, and 15 is disposed to be a position (P1) of the rear edge 13b of the pressing surface 13a of the bolt 13, a position (P2) of the rear end surface 14c of the interposition member 14, and a position (P3) of the rear end surface 15c of the locking member 15.

Furthermore, in the initial clamping state, a gap portion K which permits movement of the interposition member 14 in a predetermined width in the pipe axis direction and tilting of the interposition member 14 in a predetermined angle is formed in front of the interposition member 14 in the recess portion 12. That is, the interposition member 14 is disposed in the recess portion 12 so as to be movable and tiltable in the pipe axis direction.

Next, as illustrated in FIGS. 14(a) and 14(b), when the external force acts on the rear side in the pipe axis direction with respect to the pipe spigot 2, that is, in a direction separated from the pipe socket 3, the locking member 15 biting into the outer peripheral surface of the pipe spigot 2 in the initial clamping state moves in the recess portion 12 to the rear side in the pipe axis direction together with the pipe spigot 2. As the inclined surface 15a of the locking member 15 slides along the tapered surface 14a of the interposition member 14 by the external force, a part of the external force in the pipe axis direction becomes a component force (see FIG. 14(a)) in the direction perpendicular to the tapered surface 14a, the locking member 15 is pressed in the inner radial direction of the pipe spigot 2, and the rear wedge portion 16 and the front wedge portion 17 of the locking member 15 further bite into the outer peripheral surface 2b of the pipe spigot 2.

Furthermore, as illustrated in FIG. 14(b), since the reaction force against the biting of the rear wedge portion 16 and the front wedge portion 17 acts, the interposition member 14 tilts in an illustrated clockwise direction around a part of the rear end side of the pressing target surface 14b coming into surface-contact with a pressing surface 13a of the bolt 13 as a tilting center. At this time, as described above, since the position (P2) of the rear end surface 14c of the interposition member 14 is disposed in front in the pipe axis direction from the position (P1) of the rear edge 13b of the pressing surface 13a of the bolt 13, the tilting center of the interposition member 14 does not slide-contact with the rear edge 13b of the pressing surface 13a of the bolt 13, and it is possible to avoid damage to the rear edge 13b.

Furthermore, since the pressing target surface 14b of the interposition member 14 tilts with respect to the pressing surface 13a of the bolt 13 along with tilting of the interposition member 14, a shock-absorbing gap R1 described below is generated between the front side of the pressing target surface 14b of the interposition member 14 and the pressing surface 13a of the bolt 13.

Next, as illustrated in FIG. 15(a), when the external force acts in the front in the pipe axis direction with respect to the pipe spigot 2, that is, in a direction inserted into the pipe socket 3, the locking member 15 biting into the outer peripheral surface of the pipe spigot 2 moves forward in the pipe axis direction in the recess portion 12 together with the pipe spigot 2. Moreover, a front end portion 2c of the pipe spigot 2 comes into contact with an inner end surface 3c of the pipe socket 3, and thus, the movement of the pipe spigot 2 is regulated and completed. When the movement of the pipe spigot 2 is completed in this way, since the gap between the front surface of the locking member 15 and the front side wall 12a of the recess portion 12 still remains, and the locking member 15 does not collide with the recess portion 12, it is possible to avoid the damage to the locking member 15. Furthermore, a shock-absorbing material for absorbing the shock due to the contact may be provided between the front end portion 2c of the pipe spigot 2 and the inner end surface 3c of the pipe socket 3.

Furthermore, as illustrated in FIG. 15(a), since the gap (R2) between the pressing surface 13a of the bolt 13 and the pressing target surface 14b of the interposition member 14 increases in accordance with the movement of the pipe spigot 2, the interposition member 14 appropriately moves within the recess portion 12 between the bolt 13 and the locking member 15 according to the gravity. For example, as illustrated in FIG. 15(a), the pressing target surface 14b of the interposition member 14 is separated from the pressing surface 13a of the bolt 13, the tapered surface of the interposition member 14 and the inclined surface 15a of the locking member 15 slide, and thus, the contact location between these members 14 and 15 changes.

Next, as illustrated in FIG. 15(a), when the external force acts on the pipe spigot 2 in a direction of being separated from the pipe socket 3 again, the locking member 15 biting into the outer peripheral surface of the pipe spigot 2 moves backward in the pipe axis direction in the recess portion 12 together with the pipe spigot 2. The inclined surfaces 15a of the locking member 15 slides along the tapered surface 14a of the interposition member 14 by the external force, and a predetermined location of the pressing target surface 14b of the interposition member 14 comes into contact with the pressing surface 13a of the bolt 13.

Since the contact location of the pressing surface 13a of the bolt 13 coming into contact with the pressing target surface 14b of the interposition member 14 is a predetermined location on the front side in the pipe axis direction from the position (P1) of the rear edge 13b, it is possible to avoid damage to the rear edge 13b. Furthermore, the contact location between the pressing target surface 14b of the interposition member 14 and the pressing surface 13a of the bolt 13 in FIG. 15(b) is a new location different from the above-described contact location in FIG. 14(a).

In addition, the pressing target surface 14b of the interposition member 14 in FIG. 15(b) tilts with respect to the pressing surface 13a of the bolt 13, and a shock-absorbing gap (R3) is formed between the front of the pressing target surface 14b of interposition member 14 and the pressing surface 13a of the bolt 13. Accordingly, since the interposition member 14 coming into contact with the new location temporarily tilts based on the shock-absorbing gap (R3) as an acceptable value, the interposition member 14 and the bolt 13 do not strongly collide with each other, and thus, it is possible to absorb the shock.

Hereinafter, similarly, when the external force such as earthquake repeatedly acts on the pipe joint 1 back and forth in the pipe axis direction, the interposition member 14 and the bolt 13 are not locally concentrated and come into contact with each other, and the contact location between the interposition member 14 and the bolt 13 is dispersed each time when the external force is repeated back and forth in the pipe axis direction. Accordingly, it is possible to avoid damage due to the repeatedly concentrated shock between the members.

Figure 16:
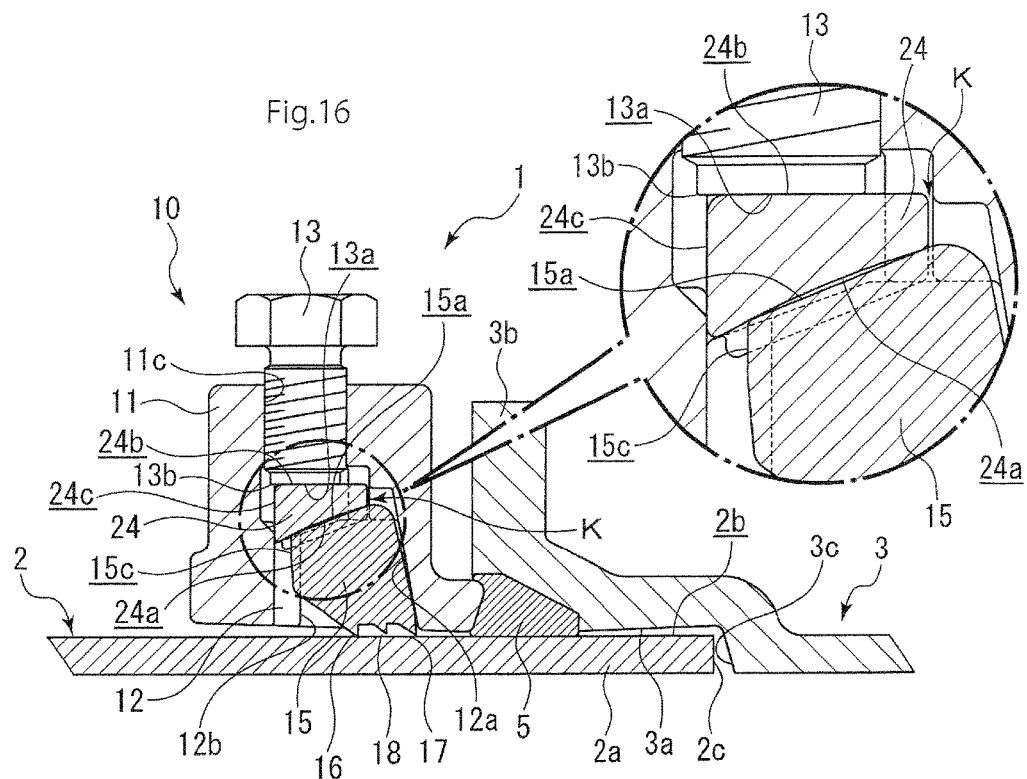
FIG. 16 is a side cross-sectional view illustrating a first modified example of the interposition member.

Next, modified examples of the interposition member of the present invention will be described. As illustrated in FIG. 16, in an interposition member 24 as a first modified example of the present invention, a tapered surface 24a is formed on a concave curved surface, in the initial state of the pipe joint described above, the tapered surface 24a partially comes into contact only with both front and rear end portions in the pipe axis direction of the inclined surface 15a of the locking member 15, and is separated from an intermediate portion in the pipe axis direction.

In this way, since the gap region between the tapered surface 24a of the interposition member 24 and the inclined surface 15a of the locking member 15 increases, it is possible to widen the shock-absorbing gap when the external force such as earthquake is repeatedly applied back and forth in the pipe axis direction.

Figure 17:
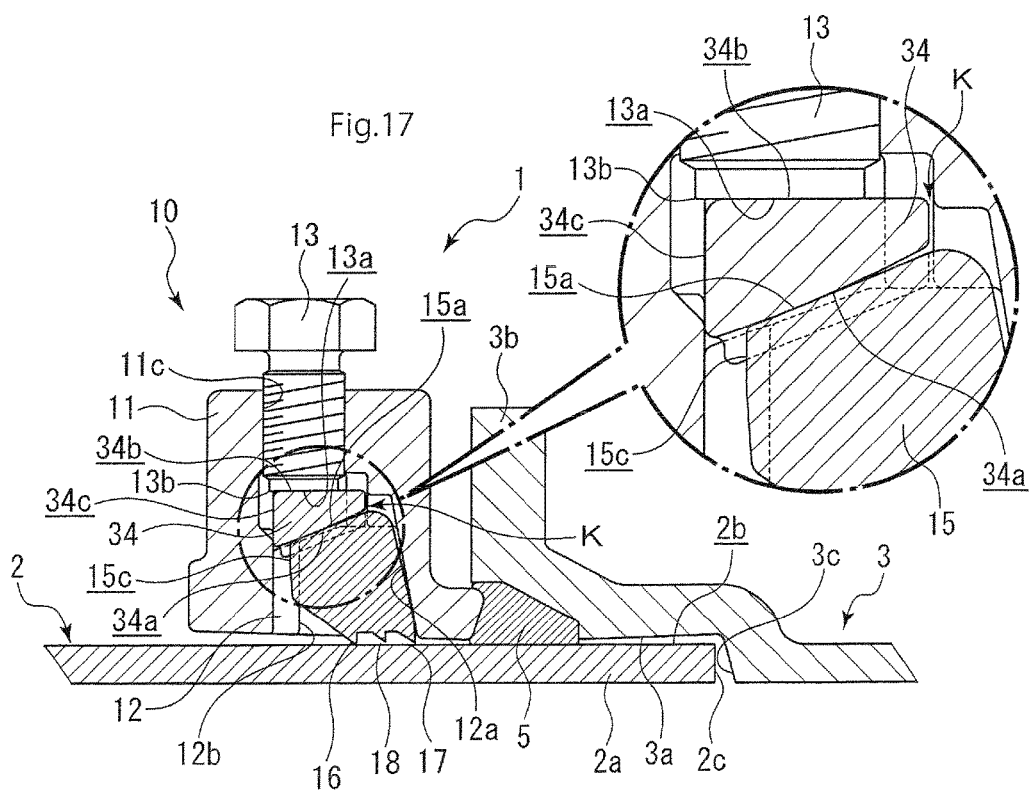
FIG. 17 is a side cross-sectional view illustrating a second modified example of the interposition member.

Furthermore, as illustrated in FIG. 17, in an interposition member 34 as a second modified example of the present invention, a tapered surface 34a is formed on a convex curved surface, in the above-described initial state of the pipe joint, the tapered surface 34a partially comes into contact only with the location except for the end portion in the pipe axis direction of the inclined surface 15a of the locking member 15, and is separated from both front and rear end portions in the pipe axis direction.

In this way, since the gap region between the tapered surface 34a of the interposition member 34 and the inclined surface 15a of the locking member 15 increases, it is possible to widen the shock-absorbing gap when the external force such as earthquake is repeatedly applied back and forth in the pipe axis direction.

Furthermore, in place of the interposition members 24 and 34 of the above-described first and second modified examples, or in addition to the interposition members 24 and 34, the inclined surface of the locking member may be formed on a curved surface, and for example, the inclined surface of the locking member coming into contact with the tapered surfaces 24a and 34a of the interposition members 24 and 34 may be formed on a convex curved surface or a concave curved surface configured to complement the mutual surface shapes.

Furthermore, although it is not particularly illustrated, the pressing surface of the bolt may be a convex curved surface or a concave curved surface, and in place of the pressing surface of the bolt, or in addition to the pressing surface of the bolt, the pressing target surface of the interposition member may also be formed on the concave curved surface or the convex curved surface. With such a configuration, it is also possible to secure the shock-absorbing gap when the external force such as earthquake is repeatedly applied back and forth in the pipe axis direction between the pressing surface of the bolt and the pressing target surface of the interposition member.

The separation preventing device of the present invention according to the example 3 exhibits the following effects.

Even when the external force for separating or inserting the fluid pipe is applied to the fluid pipe in the pipe axis direction, as the interposition member 14 between the locking member 15 and the bolt 13 as a pressing member moves in the recess portion 12 of the main body member 11 in the pipe axial direction by an acceptable value of a predetermined width, the tapered surface 14a of the interposition member 14 changes the contact portion with the outer surface of the locking member 15. Accordingly even when the external force in the pipe axis direction for separating and inserting the fluid pipe is repeated, since it is possible to disperse the mutual contact locations so that the locking member 15, the bolt 13, and the interposition member 14 do not locally concentrate and collide with one another, it is possible to prevent damage to the members 13, 14, and 15 due to the repeated concentration collision, and thus, it is possible to firmly maintain the separation preventing function of the fluid pipe, thereby being able to satisfactorily hold the piping structure of the initial connection.

Furthermore, since the tapered surface 14a of the interposition member 14 and the inclined surface 15a of the locking member 15 come into contact with each other substantially in parallel in a tilting state, it is possible to ward off the external force by the sliding-contact between the parallel surfaces tilting with respect to the pipe axis direction, without directly receiving the external force acting in the pipe axis direction.

Furthermore, as the interposition member 14 moves in the recess portion 12 of the main body member 11 in the pipe axis direction by an acceptable value of a predetermined width, by allowing the interposition member 14 to tilt with respect to the bolt 13, it is possible to hold the pressing force so that the bolt 13, the interposition member 14, and the locking member 15 are not separated from one another even by the movement of the interposition member 14.

Figure 18:
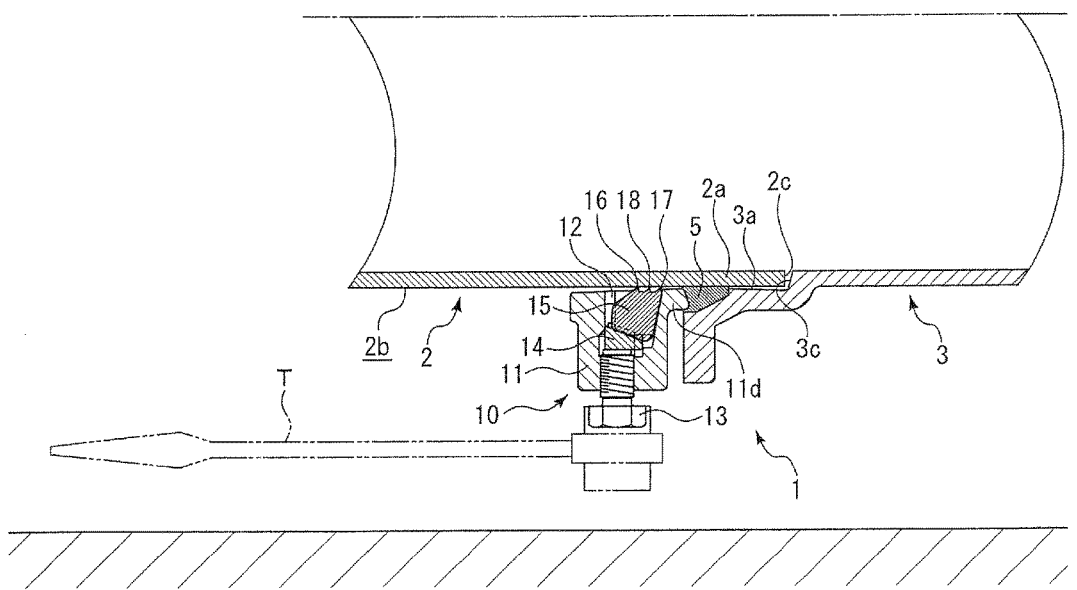
FIG. 18 is a side cross-sectional view illustrating a situation in which a bolt of the separation preventing device is clamped.

Furthermore, as illustrated in FIG. 18, since the bolt 13 is provided in the main body member 11 so as to be movable back and forth in the radial direction of the pipe spigot 2, during the operation of moving the bolt 13 back and forth in the radial direction, an operating means such as a tool T does not interfere with the outer surface of the pipe spigot 2.

Furthermore, since the interposition member 14 does not come into contact with the rear edge 13b of the pressing surface 13a of the bolt 13, it is possible to prevent damage to the rear edge 13b, and it is possible to vary the tilting center of the interposition member 14 and the tilting center of the locking member 15 in the pipe axis direction. Accordingly, it is possible to increase the variation of the tilting aspects of the interposition member 14 and the locking member 15, thereby always being able to press the locking member 15 in response to various directions and magnitudes of the external force.

Example 4

A separation preventing device according to the example will be described with reference to FIGS. 1 to 4, 19 and 20. In addition, it is not described about the constitution which is the same as the examples 1-3 mentioned above.

As illustrated in FIG. 2(a), the peripheral side wall 12d is provided with a stepped portion with which an elastic body 19 to be described later is engaged. However, the stepped portion may not be provided.

Hereinafter, the aspect of fitting of the locking member forming the separation preventing device of the present invention into the recess portion will be described.

As illustrated in FIGS. 3(a) and 3(b), the locking member 15 is formed in a substantially arcuate shape including arc-shaped wedge portions 16, 17, and 18 along the outer peripheral surface of the pipe spigot 2, and is equipped with fitting grooves 15d and 15d at both end portions in the circumferential direction of the locking member 15. As illustrated in FIGS. 2(a) and 2(b), the locking member 15 is housed in the recess portion 12 of the main body member 11, by fitting the elastic body 19 having elasticity into the respective fitting grooves 15d. Thus, the locking member 15 is held within the recess portion 12 by the elastic restoring force of the elastic body 19 that is elastically contracted by being compressed between the fitting groove 15d and the peripheral side wall 12d of the recess portion 12, and thus falling out of the recess portion 12 is prevented.

Figure 19:
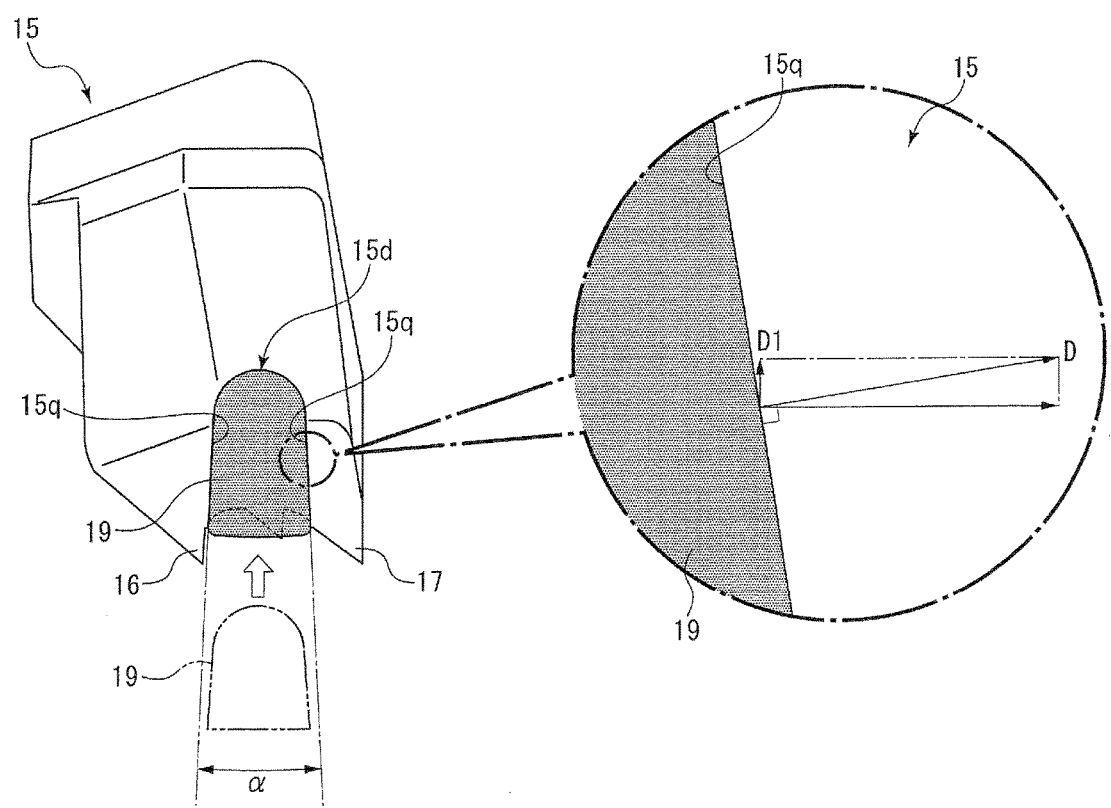
FIG. 19 is a side view illustrating a state in which the elastic body is fitted into the fitting groove of the locking member.

As illustrated in FIG. 19, the elastic body 19 is made of, for example, elastic material, such as natural rubber of SBR, CR, and NBR or the like, synthetic rubber, or resin, and in its natural state, the elastic body 19 has a generally bullet shape in which a front end is a hemisphere surface and gradually increases in diameter toward a rear end, and is formed to be slightly greater than the inside of the fitting groove 15d.

The fitting groove 15d is formed between the front wedge portion 17 and the rear wedge portion 16, penetrates inward and outward in the radial direction of the locking member 15, and groove wall portions 15q and 15q constituting the fitting groove 15d face each other so as to be gradually narrowed in a tapered shape toward the outer radial direction at a predetermined tapered angle α.

Next, the fitting process of the elastic body 19 to the fitting groove 15d will be described. As illustrated in FIG. 19, the front end of the elastic body 19 is gradually inserted toward the outer radial side from the inner radial side of the fitting groove 15d. Since the front end side of the elastic body 19 has a relatively small diameter and the inner diameter side of the fitting groove 15d has a relatively large diameter, at the insertion intermediate stage of the elastic body 19, the outer surface of the elastic body 19 does not come into slide-contact with the groove wall portions 15q and 15q of the fitting groove 15d, and thus, it is possible to avoid the distorted elastic deformation of the elastic body 19.

The elastic body 19 fitted into the fitting grooves 15d is pressured between the facing groove wall portions 15q and 15q, the front end portion and the rear end portion of the elastic body 19 are slightly elastically deformed and bulge, and as illustrated by a portion surrounded by a dotted line of FIG. 19, the elastic restoring force D of the elastic body 19 acts in a direction perpendicular to the tapered surface of each of the groove wall portions 15q and 15q.

More specifically, the elastic restoring force D of the elastic body 19 in the fitting groove 15d is divided into a component force D1 facing the outer radial side in a direction perpendicular to the pipe axis, and a component force in the pipe axis direction. By the component force D1 in the direction perpendicular to the pipe axis, the locking member 15 constituting the groove wall portions 15q and 15q is biased toward the outer diameter side in the direction perpendicular to the pipe axis, in other words, toward the inside of the recess portion 12.

Figure 20:
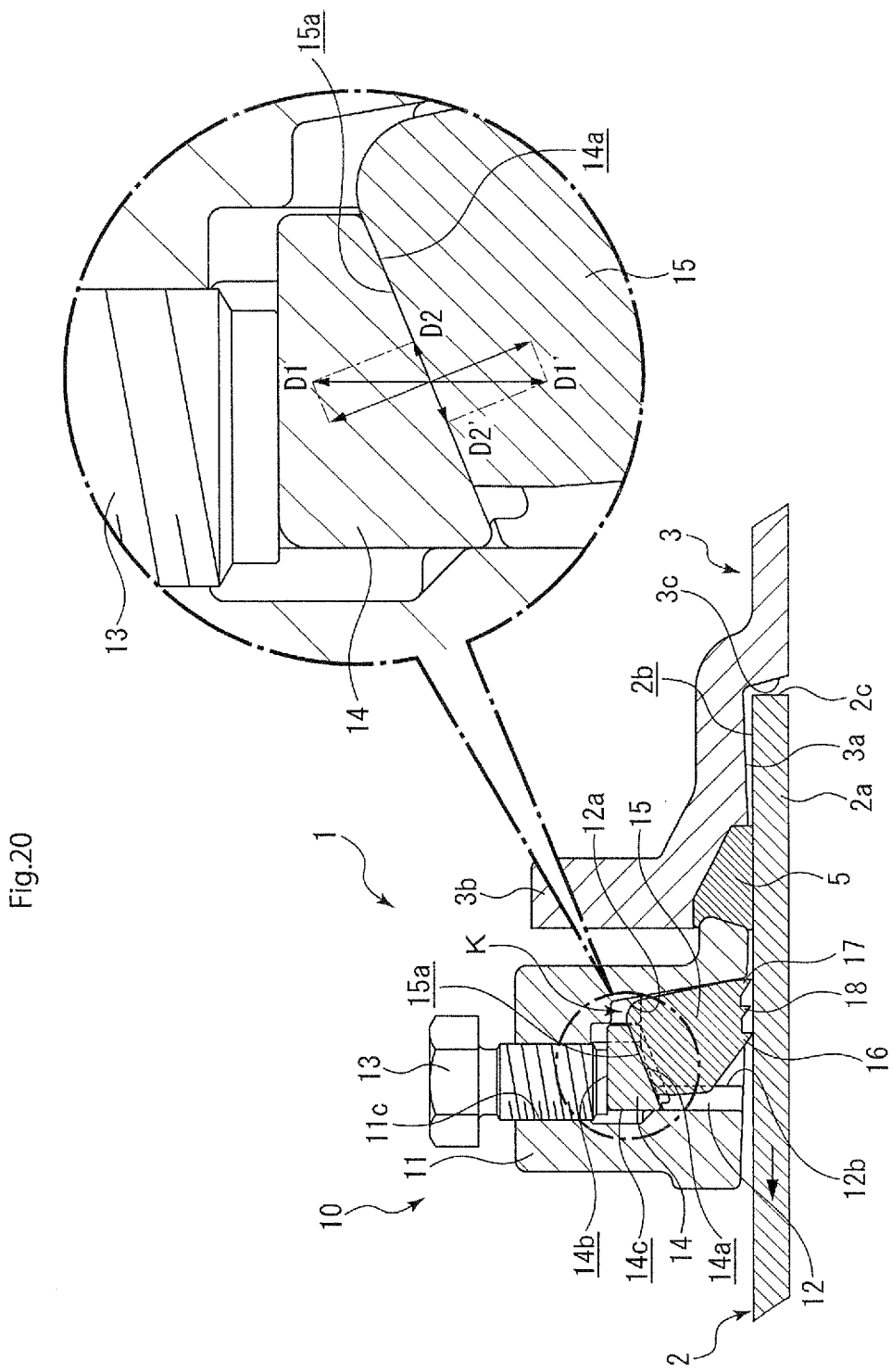
FIG. 20 is a view illustrating a state in which the elastic restoring force of the elastic body acts on the locking member and the interposition member.

Furthermore, as illustrated in FIGS. 19 and 20, the locking member 15 to which the force component D1 is applied on the outer diameter side in the direction perpendicular to the pipe axis presses the tapered surface 14a of the interposition member 14 that faces the inclined surface 15a of the locking member 15 substantially in parallel. Therefore, as illustrated in FIG. 20, the component force D1 acting on the locking member 15 is further divided into a component force D2 facing the front side in the pipe axis direction, and a component force in the direction perpendicular to the inclined surface 15a. That is, the locking member 15 is biased to the front side in the pipe axis direction within the recess portion 12 by the component force D2.

Meanwhile, as illustrated in FIG. 20, a reaction force D1' of the same magnitude acts on the interposition member 14 including the tapered surface 14a in the opposite direction of the component force D1. The reaction force D1' acting on the interposition member 14 is further divided into a component force D2' facing the rear side in the pipe axis direction, and a component force in the direction perpendicular to the tapered surface 14a. That is, the interposition member 14 is biased to the rear side in the pipe axis direction within the recess portion 12 by the component force D2'.

That is, according to the configuration of such fitting grooves 15d, in the locking member 15, by fitting the elastic body 19 into the fitting grooves 15d equipped with the groove wall portions 15q and 15q which are gradually narrowed toward the outer radial direction, the elastic restoring force gradually greatly acts toward the outer radial direction, thereby pressing the groove wall portions 15q and 15q toward the outer radial direction. As a result, the locking member 15 is biased in the outer radial direction within the recess portion 12 by the elastic restoring force of the elastic body 19. As in the present embodiment, in the structure of the separation prevention in which the bolt 13 provided in the main body member 11 is screwed to cause the locking member 15 to bite into the outer peripheral surface 2b of the pipe spigot 2 via the interposition member 14, where the locking member 15 does not come into contact with the front side wall at the initial state, a state in which the movement distance of the wedge action is reduced and the separation preventing force is reduced may occur, or where the interposition member 14 does not come into contact with the rear side wall at the initial state, a state in which the interposition member 14 moves backward during wedging action of the locking member 15 and the separation preventing force is reduced may occur. However, it is possible to prevent these states by the elastic restoring force of the elastic body 19.

The separation preventing device of the present invention according to the example 4 exhibits the following effects.

Since the elastic restoring force of the elastic body 19 fitted into the fitting grooves 15d formed tapering toward the outer diameter direction of the pipe spigot 2 acts stronger as it goes toward the outer diameter side, the locking member 15 can be reliably housed without falling out of the interior of the recess portion 12, and when the locking member 15 housed in the recess portion 12 moves or tilts, since the elastic body 19 fitted into the fitting groove 15d follows the movement of the locking member 15, the elastic body 19 is not detached from the recess portion 12 and does not affect the movement and tilting of the locking member 15, and the locking member 15 can move or tilt as designed.

Furthermore, since the fitting grooves 15d are formed between the plurality of wedge portions 16 and 17 provided on the locking member 15, it is possible to form the fitting grooves 15d by effectively utilizing the space between the wedge portions without dominating the regions of the plurality of wedge portions 16 and 17, the fitting grooves 15d do not affect the locking capability of the locking member 15.

Furthermore, since the elastic body 19 elastically deformed in the penetration direction of the fitting grooves 15d comes into contact with the inner wall of the recess portion 12 or the outer peripheral surface 2b of the pipe spigot 2, the elastic body 19 can be made to function as a cushioning material.

Furthermore, by the locking member 15 biased to the inside of the recess portion 12, it is possible to clamp the interposition member 14 between the bolt 13 and the locking member 15, and by converting the elastic restoring force acting in the outer radial direction into the pipe axis direction using the tapered surface 14a of the interposition member 14 by the elastic body 19 fitted into the fitting grooves 15d having the tapered width toward the outer radial direction, it is possible to bias the interposition member 14 toward a predetermined position in the pipe axis direction.

The embodiments 1-4 of the present invention have been described with reference to the drawings, but the specific configuration is not limited to these embodiments, and modifications and additions within the scope that does not depart from the scope of the present invention are also included in the present invention.

For example, in the above-described embodiments 1-4, the main body member 11 equipped with the recess portion 12 was described as being a gland which is fixedly connected to the pipe socket 3 by the fastening member 4, but for example, the main body member may be a reinforcing bracket for increasing the holding ability of the pipe joint, or the main body member may be a pipe socket itself into which the pipe spigot as the fluid pipe is inserted, and a recess portion for housing the locking member may be formed in the receiving unit of the pipe socket.

Furthermore, for example, in the above-described embodiments 1-4, the respective surfaces of the bolt 13, the interposition member 14, and the locking member 15 directly abut against one another or come into slide-contact with one another, but for example, all or part of the surface of the interposition member may be coated with a rubber lining or the like, or a shock-absorbing material made of rubber, resin or the like may be provided on the tapered surface of the interposition member or the inclined surface of the locking member. According to such a configuration, when the external force such as the earthquake is repeatedly applied back and forth in the pipe axis direction, it is possible to absorb the shock that is loaded on each member within the recess portion.

REFERENCE NUMERALS 1 pipe joint
2 pipe spigot (fluid pipe)
2b outer peripheral surface
2c front end portion
3 pipe socket
4 fastening member
5 sealing member
10 separation preventing device
11 main body member
12 recess portion
12b pressing wall
12f rear side wall
13 bolt (pressing member)
13a pressing surface
13b rear edge
14 interposition member (pressing member)
14a tapered surface
14b pressing target surface 14c rear end surface
15 locking member
15a inclined surface
15c rear end surface
15d fitting groove
15e bottom
15f convex portion end surface
15g central portion
15k peripheral side portion
15m peripheral side portion inclined surface
15n contact portion
15q groove wall portion
16 rear wedge portion
17 front wedge portion
18 auxiliary wedge portion (projection portion)
19 elastic body
24 interposition member
24a tapered surface
34 interposition member
34a tapered surface

What is claimed is:

1. A separation preventing device that prevents separation of a fluid pipe in a pipe axis direction, the separation preventing device comprising:
a main body member that is externally fitted to an outer peripheral surface of the fluid pipe and has a recess portion facing the outer peripheral surface;
a locking member that is housed in the recess portion in a tiltable manner and is able to bite into the outer peripheral surface of the fluid pipe;
a pressing member that is provided in the main body member and presses the locking member so as to bite into the outer peripheral surface of the fluid pipe; and
an interposition member interposed between the locking member and the pressing member,
wherein the pressing member is configured to press a center portion in the circumferential direction of the locking member; the interposition member is equipped with a tapered surface coming into contact with an outer surface of the locking member, and is housed in the recess portion in a state of having an acceptable movement and tilting value in the pipe axis direction of the fluid pipe; and a gap portion which permits movement and tilting of the locking member is formed between an end surface on a rear side of the center portion of the locking member and a side wall surface of the recess portion.

2. The separation preventing device of a fluid pipe according to claim 1, wherein the outer surface of the locking member is formed on the inclined surface that comes into contact with the tapered surface of the interposition member substantially in parallel.

3. The separation preventing device of a fluid pipe according to claim 1, wherein the interposition member is equipped with a pressing target surface that comes into contact with the pressing surface of the pressing member in a tiltable manner.

4. The separation preventing device of a fluid pipe according to claim 1, wherein the pressing member is provided in the main body member so as to be movable back and forth in a radial direction of the fluid pipe.

5. The separation preventing device of a fluid pipe according to claim 1, wherein a rear edge of the pressing surface of the pressing member, a rear end surface of the interposition member, and a rear end surface of the locking member are sequentially disposed from the rear side in the pipe axis direction of the fluid pipe.

6. The separation preventing device of a fluid pipe according to claim 1, wherein the locking member has a plurality of wedge portions in a front-back direction of a pipe axis of the fluid pipe, and is equipped with a projection portion that regulates biting of a front wedge portion of the plurality of wedge portions into the fluid pipe, when the fluid pipe moves to a separation side in the pipe axis direction.

7. The separation preventing device of a fluid pipe according to claim 6, wherein the projection portion is provided between the front wedge portion and the rear wedge portion of the plurality of wedge portions.

8. The separation preventing device of a fluid pipe according to claim 6, wherein the projection portion is a wedge portion that bites into the fluid pipe at least by tilting.

9. The separation preventing device of a fluid pipe according to claim 6, wherein a leading end of the projection portion does not project from a line that connects a leading end of the front wedge portion and a leading end of the rear wedge portion.

10. The separation preventing device of a fluid pipe according to claim 6, wherein the wedge portions tilt to a front side in the pipe axis direction of the fluid pipe.

11. The separation preventing device of a fluid pipe according to claim 1, wherein the locking member has a central portion, a peripheral side portion extending to a lateral side of the central portion, and is equipped with a contact portion with which the peripheral side portion and the recess portion come into contact in a state in which the central portion of the locking member and the recess portion are spaced apart from each other.

12. The separation preventing device of a fluid pipe according to claim 11, wherein the peripheral side portion of the locking member is equipped with a peripheral side portion inclined surface that tilts toward an inner side in a radial direction of the fluid pipe and toward a front side in the pipe axis direction of the fluid pipe from the contact portion.

13. The separation preventing device of a fluid pipe according to claim 11, wherein a dimension in the pipe axis direction of the central portion of the locking member is formed to be greater than a dimension in the pipe axis direction of the peripheral side portion of the locking member.

14. The separation preventing device of a fluid pipe according to claim 11, wherein the recess portion is equipped with a pressing wall coming into contact with the peripheral side portion of the locking member, and a rear side wall facing the central portion of the locking member.

15. The separation preventing device of a fluid pipe according to claim 1, wherein at an end portion of the locking member in a circumferential direction of the fluid pipe, a fitting groove configured to fit an anti-falling elastic body of the locking member from the recess portion is formed tapering toward an outer diameter direction of the fluid pipe.

16. The separation preventing device of a fluid pipe according to claim 15, wherein the fitting grooves are formed between a plurality of wedge portions provided on the locking member.

17. The separation preventing device of a fluid pipe according to claim 15, wherein the fitting grooves of the locking member are formed to penetrate in a radial direction of the fluid pipe.

18. A pipe joint comprising:
the fluid pipe;
a pipe socket into which a front end portion of the fluid pipe is inserted; and the separation preventing device of the fluid pipe that prevents separation of the fluid pipe from the pipe socket according to claim 1.

19. The separation preventing device of a fluid pipe according to claim 2, wherein the interposition member is equipped with a pressing target surface that comes into contact with the pressing surface of the pressing member in a tiltable manner.

20. The separation preventing device of a fluid pipe according to claim 2, wherein the pressing member is provided in the main body member so as to be movable back and forth in a radial direction of the fluid pipe.

21. The separation preventing device of a fluid pipe according to claim 2, wherein a rear edge of the pressing surface of the pressing member, a rear end surface of the interposition member, and a rear end surface of the locking member are sequentially disposed from the rear side in the pipe axis direction of the fluid pipe.

22. The separation preventing device of a fluid pipe according to claim 7, wherein the projection portion is a wedge portion that bites into the fluid pipe at least by tilting.

23. The separation preventing device of a fluid pipe according to claim 7, wherein a leading end of the projection portion does not project from a line that connects a leading end of the front wedge portion and a leading end of the rear wedge portion.

24. The separation preventing device of a fluid pipe according to claim 7, wherein the wedge portions tilt to a front side in the pipe axis direction of the fluid pipe.

25. The separation preventing device of a fluid pipe according to claim 12, wherein a dimension in the pipe axis direction of the central portion of the locking member is formed to be greater than a dimension in the pipe axis direction of the peripheral side portion of the locking member.

26. The separation preventing device of a fluid pipe according to claim 12, wherein the recess portion is equipped with a pressing wall coming into contact with the peripheral side portion of the locking member, and a rear side wall facing the central portion of the locking member.

27. The separation preventing device of a fluid pipe according to claim 16, wherein the fitting grooves of the locking member are formed to penetrate in a radial direction of the fluid pipe.

* * * * *